US00RE46803E

(19) United States
(12) Reissued Patent
Bronston et al.

(10) Patent Number: US RE46,803 E
(45) Date of Reissued Patent: *Apr. 24, 2018

(54) PORTABLE MULTIPURPOSE WHOLE BODY EXERCISE DEVICE

(71) Applicant: BALANCED BODY, INC., Sacramento, CA (US)

(72) Inventors: Darya Kathleen Bronston, Santa Barbara, CA (US); Matthew Arf, Santa Barbara, CA (US); John Russell Stump, Santa Barbara, CA (US)

(73) Assignee: Balanced Body, Inc., Sacramento, CA (US)

( * ) Notice: This patent is subject to a terminal disclaimer.

(21) Appl. No.: 15/060,410

(22) Filed: Mar. 3, 2016

Related U.S. Patent Documents

Reissue of:
(64) Patent No.: 8,715,146
Issued: May 6, 2014
Appl. No.: 13/237,393
Filed: Sep. 20, 2011

U.S. Applications:
(63) Continuation of application No. 12/824,493, filed on Jun. 28, 2010, now Pat. No. 8,029,425.

(60) Provisional application No. 61/223,381, filed on Jul. 7, 2009.

(51) Int. Cl.
*A63B 21/00* (2006.01)
*A63B 21/02* (2006.01)
*A63B 21/16* (2006.01)

(52) U.S. Cl.
CPC ..... *A63B 21/00* (2013.01); *A63B 21/00043* (2013.01); *A63B 21/00069* (2013.01); *A63B 21/02* (2013.01); *A63B 21/16* (2013.01); *A63B 21/4033* (2015.10); *A63B 2210/58* (2013.01)

(58) Field of Classification Search
None
See application file for complete search history.

(56) References Cited

U.S. PATENT DOCUMENTS

| | | | |
|---|---|---|---|
| 1,621,477 | A | 3/1927 | Pilates |
| 1,667,248 | A | 4/1928 | Eisele |
| 1,903,798 | A | 4/1933 | Turner |
| 2,280,935 | A | 4/1942 | Stevens, Jr. |
| 2,595,230 | A | 5/1952 | Daviau |
| 2,962,187 | A | 11/1960 | Morris |

(Continued)

FOREIGN PATENT DOCUMENTS

| | | |
|---|---|---|
| FR | 2296381 | 7/1976 |

OTHER PUBLICATIONS

Supplemental European Search Report, dated Mar. 9, 2016, from related European Patent Application No. EP1079443.8.

(Continued)

*Primary Examiner* — Glenn K Dawson
(74) *Attorney, Agent, or Firm* — Greenberg Traurig, LLP

(57) ABSTRACT

A portable multipurpose whole body exercise device which can be used for general fitness, Pilates-type, core strengthening, therapeutic, and rehabilitative exercises as well as stretching and physical therapy and which includes storable accessories that can be withdrawn from storage within the device and subsequently secured to the main tubular portion of the apparatus. The storable accessories can be used for a variety of resistance, stretching, and strength training exercises.

20 Claims, 29 Drawing Sheets

(56) References Cited

U.S. PATENT DOCUMENTS

| | | | | |
|---|---|---|---|---|
| 3,678,611 | A | 7/1972 | Files | |
| 3,757,449 | A | 9/1973 | Schindler | |
| 4,084,815 | A | 4/1978 | Flannery | |
| 4,272,074 | A | 6/1981 | Sferle | |
| 4,580,778 | A | 4/1986 | Van Noord | |
| 4,643,302 | A | 2/1987 | Baumgardner | |
| 4,659,077 | A * | 4/1987 | Stropkay | A63B 21/018 482/120 |
| 4,706,953 | A | 11/1987 | Graham | |
| 4,884,802 | A | 12/1989 | Graham | |
| 4,948,119 | A | 8/1990 | Robertson, Jr. | |
| 4,951,941 | A | 8/1990 | Resk | |
| 5,425,194 | A | 6/1995 | Miller | |
| 5,478,299 | A | 12/1995 | Harmon et al. | |
| 5,514,058 | A | 5/1996 | Buoni et al. | |
| 5,575,742 | A | 11/1996 | Wu | |
| 5,681,248 | A | 10/1997 | Vani | |
| 5,702,331 | A | 12/1997 | Perham | |
| 5,741,207 | A | 4/1998 | Buoni et al. | |
| 5,824,013 | A | 10/1998 | Allen | |
| 5,913,756 | A * | 6/1999 | Glaser | 482/128 |
| 5,997,442 | A | 12/1999 | Cordes | |
| 6,062,382 | A | 5/2000 | Czerkie | |
| 6,120,423 | A | 9/2000 | Mackey et al. | |
| 6,120,424 | A | 9/2000 | Arline | |
| 6,186,531 | B1 * | 2/2001 | Parent | B60D 1/52 224/519 |
| 6,276,528 | B1 | 8/2001 | Nowotny et al. | |
| 6,402,668 | B1 * | 6/2002 | Harker | 482/121 |
| 6,468,190 | B1 | 10/2002 | Fazio et al. | |
| 6,527,685 | B2 | 3/2003 | Endelman et al. | |
| 6,634,998 | B2 | 10/2003 | Siaperas | |
| 6,663,547 | B1 * | 12/2003 | Hughes | 482/141 |
| D484,694 | S | 1/2004 | Leen | |
| 6,740,008 | B1 | 5/2004 | Ho et al. | |
| 6,872,175 | B2 | 3/2005 | Lin | |
| D503,756 | S | 4/2005 | Chiang | |
| 6,908,417 | B2 | 6/2005 | Jackson | |
| 6,926,650 | B2 | 8/2005 | Endelman et al. | |
| 7,137,926 | B2 | 11/2006 | Barrows | |
| 7,270,628 | B2 | 9/2007 | Campanaro et al. | |
| 7,322,909 | B1 | 1/2008 | Loccarini et al. | |
| 7,361,126 | B2 | 4/2008 | Bruce | |
| 7,674,209 | B2 | 3/2010 | Greene | |
| 8,029,425 | B2 * | 10/2011 | Bronston | A63B 21/02 482/123 |
| 2002/0086779 | A1 * | 7/2002 | Wilkinson | A63B 23/1209 482/118 |
| 2003/0032535 | A1 * | 2/2003 | Wang | A63B 21/005 482/138 |
| 2003/0216220 | A1 | 11/2003 | Rota | |
| 2004/0043873 | A1 * | 3/2004 | Wilkinson | A63B 22/0005 482/54 |
| 2004/0132590 | A1 | 7/2004 | Papas | |
| 2004/0204294 | A2 * | 10/2004 | Wilkinson | A63B 22/0005 482/54 |
| 2005/0049123 | A1 | 3/2005 | Dalebout et al. | |
| 2005/0107226 | A1 * | 5/2005 | Monda | 482/121 |
| 2005/0124471 | A1 * | 6/2005 | Wilkinson | A63B 22/0005 482/121 |
| 2005/0130814 | A1 * | 6/2005 | Nitta et al. | 482/121 |
| 2005/0143234 | A1 | 6/2005 | Massey | |
| 2005/0215928 | A1 | 9/2005 | Banks et al. | |
| 2006/0128540 | A1 * | 6/2006 | Engle | A63B 21/04 482/123 |
| 2007/0123400 | A1 * | 5/2007 | Keiser | A63B 21/0087 482/112 |
| 2007/0197356 | A1 | 8/2007 | Miller | |
| 2008/0020912 | A1 * | 1/2008 | Dalebout | A63B 21/026 482/129 |
| 2008/0039304 | A1 | 2/2008 | Mattox | |
| 2008/0070210 | A1 | 3/2008 | Hitzmann | |
| 2008/0090706 | A1 | 4/2008 | Boland et al. | A63B 21/0004 482/126 |
| 2010/0213090 | A1 | 8/2010 | Bebrin et al. | |

OTHER PUBLICATIONS

"Ped-a-Pul" advertisement from catalog entitled "Finely crafted pilates equipment," by Balanced Body, Inc., dated Mar. 2004.

International Search Report and Written Opinion issued in PCT/US2010/001857, Feb. 25, 2011.

* cited by examiner

PORTABLE MULTIPURPOSE WHOLE BODY EXERCISE DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application is a Continuation Application of U.S. patent application Ser. No. 12/824,493, filed on Jun. 28, 2010, which claims the benefit of U.S. Provisional Application No. 61/223,381, filed Jul. 7, 2009.

FIELD OF THE INVENTION

The present invention relates generally to the field of exercise and therapeutic equipment and more particularly to a portable whole body exercise apparatus with multiple purpose use as a core fitness development apparatus, as an accessory to general fitness, Pilates exercises, as a therapeutic and/or rehabilitative aid, to aid with general stretching, body rolling, balance training, or to perform specific sports related exercises, such as, for example, golf exercises, tennis exercises, volleyball exercises, or sailing exercises.

BACKGROUND

There are numerous exercise equipment options for home use on the market, all of which target specific or multiple muscle groups, but none that are known by the inventors that can be utilized in the numerous ways that the disclosed embodiments of a portable multi-purpose whole body exercise device can be, for general fitness, therapeutic aid, rehabilitative aid, and exercise.

One such device is a Multi-purpose Exercise Device U.S. Pat. No. 5,681,248 to Vani (1997), comprising a cylindrical pillow (12) and a pair of handles (14) that extends beyond the lateral portions of the pillow. Each handle is attached to the ends of flexible tubing (16) that runs through the core of the cylindrical pillow. While you can perform some exercises with the device you are limited in range of motion and orientation of resistance.

Another device is U.S. Pat. No. 6,872,175 to Lin (2005) which discloses an Exercise Balance Trainer comprising an elongated hard board (20) connected to a resilient ball body (10). The board has a plurality of through holes (24) that may receive flexible ropes (31, 32). The flexible ropes have handgrips (313, 312) attached to one end. The body ball is a dome shape resilient body attached to one side of the board. The disclosed embodiments of a portable multi-purpose whole body exercise device provide an improved way of exercising with a cylindrical roller that the spine can be aligned with during exercise with or without balancing.

Another device U.S. Pat. No. 6,634,998 to Siaperes (2003) is a Multipurpose Exercise Apparatus that is rectangular in shape with a box-like body and a hinged cover that can be raised in order for the user to be reclined on the device while performing resistance type exercises. The resistance is supplied by bands that attach to the side of the box frame, but the device is cumbersome and not easily transportable.

Another apparatus known as a Manually Operated Therapeutic Roller and Exercise Device, U.S. Pat. No. 3,298,687 discloses a cylindrical roller made of hard material hollow core with a foam rubber covering glued to the roller and a flexible rubber sheet secured over the foam rubber covering. A cylindrical rotatable shaft is secured to each end of the cylindrical roller that allows for rotational motion between the core and shaft. Extending through a socket in each end of the shaft is a grip handle that is attached to an elastic cord. The elastic cord extends from said first socket internally through the shaft to a return pulley secured to the opposite socket and is attached to the opposite internal lateral surface of said first socket. This device is also limited in capability because the elastic cords are in fixed locations and cannot be relocated for increased exercises.

Another device is known as a foam roller. The foam roller is well known to the fitness and rehabilitation industry and is seen in nearly every gym today. The foam roller is used for stretching and flexibility improvement as well as for rehab of the pine, core trunk muscles, and limbs. While a foam roller is easily transportable it is limited in what exercises can be done with the roller alone, whereas the disclosed embodiments of a portable multi-purpose whole body exercise device provide attachable accessories which can be utilized for a wide range of exercises.

Another style of exercise, Pilates, is a form of exercise that develops and strengthens core muscles by conducting certain movements of the body and limbs with applied resistance and in particular physiological posture to attain improved postural control and core strength. Exercises are conducted that focus on core muscles and muscle control during prescribed movements with the use of proper breathing techniques in order to strengthen muscles and prevent injury. Injury recovery is one of the key goals of the Pilates method.

Disclosed embodiments of the current invention incorporate a unique configuration that allows for a wide range of general fitness, Pilates type, therapeutic, rehabilitative, and core strengthening exercises for the beginner all the way up to one advanced in the art of fitness Pilates and/or rehabilitative movements or exercises.

Existing equipment used for Pilates exercises are large and expensive and typically what you would find in a Pilates studio, not in one's home or with someone on the go like personal trainers. The ability to perform Pilates-type exercises while traveling would also be a tremendous benefit to those whose work life takes them away from home and their Pilates studio.

One such piece of equipment is known as the Pilates Reformer. The Reformer is a large device used for core strengthening exercises. The device is the size of a twin bed and is meant to be stationary, not portable. The device is constructed much like a bed frame with the dynamic portions secured to the inside of the frame enabling use for different Pilates exercises. This type of device is to be used for Pilates workouts in the studio or private gym setting and cannot be transported without great effort.

Another apparatus used for Pilates exercise, is known as the Cadillac. This type of device is another large device that is designed to be used in the studio or other stationary setting. It has a similar base frame to the Reformer, although it is taller and also has extension bars that run vertically off of each corner of the base frame, with a cross bar connected at the top of each vertical bar. Certain exercises and stretching routines are performed in conjunction with these extension bars, but again this large device is used in the studio setting and is very costly.

Thus, there is a need for a portable apparatus that allows individuals to perform general fitness, Pilates-type, core strengthening, therapeutic and rehabilitative exercises in the comfort of their own home or while traveling. Furthermore, there is a need for such an apparatus that is affordable and can be used within the personal trainer or rehabilitation setting or in the traditional gym class setting for group training.

Accordingly, the disclosed embodiments of a portable multi-purpose whole body exercise device have the ability to store accessories which are easily removed and configured to perform a wide range of general fitness, Pilates-type, core strengthening, therapeutic and rehabilitative exercises. The disclosed embodiments of a portable multi-purpose whole body exercise device can easily be transported with minimal effort. The disclosed embodiments of a portable multi-purpose whole body exercise device can also easily be setup with minimal effort. A wide range of adaptable accessories can also be utilized with the disclosed embodiments of a portable multi-purpose whole body exercise device that will enable the user to perform a wide range of exercises.

SUMMARY

Embodiments of the present disclosure provide a portable multi-purpose whole body exercise device which can be used to perform a wide range of general fitness, Pilates-type, core strengthening, therapeutic and rehabilitative exercises. The portable multi-purpose whole body exercise device is made of a rigid tube, sometimes referred to as a "roller," in the range of 5 to 8 inches in diameter and 3 to 4 feet in length. The rigid tube may be made of hard plastic, aluminum or another rigid material and must be strong enough to withstand the weight of the user when lying along the length of the tube, when standing or when kneeling on the tube. The wall thickness of the tube may be in the range from ⅛" to ½" depending on the material used.

The center portion of the outer surface of the rigid tube is covered with an interchangeable resilient material such as foam or rubber, which can range in thickness from ½" to 2". The resilient material will provide a cushioning interface between the rigid roller surface and the body of the user. The cover may be interchanged with resilient material of different firmness and thickness depending upon the preference of the user. The ends of the rigid tube portion of the portable multi-purpose whole body exercise device extend beyond the resilient covering, and are sometimes referred to herein as "exposed" or "extruded" ends. The exposed ends have holes and notches to receive different types of resistance attachments. Such attachments might be rigid extension bars with Variable Resistance Modules (VRM). In an exemplary embodiment, the attachments can be extracted out from inside of the rigid core of the tube and folded out into receivable notches.

Another attachment might be hollow rods with resistance bands with hand loops that run through the hollow center of the rod. Direct flexible attachments such as bungee cord or elastic bands could also be attached directly to the holes in the exposed ends of the rigid core. Thus the user has a wide range of options for the various attachment mechanisms depending upon the individual's needs or exercise practice.

In an exemplary embodiment, the portable multi-purpose whole body exercise device includes retractable extensions bars that withdraw from the hollow rigid core and fold outward perpendicular to the long axis of the core roller. The extension bars have a Variable Resistance Module (VRM), that are removable and can attach to the ends of said extension bars or anywhere along said extension bar. Other resistance mechanisms could also be attached to the ends of said extension bars, to allow for a wide range of general fitness, Pilates-type, core strengthening, therapeutic and rehabilitative exercises.

In this exemplary embodiment, two sets of extension bars are juxtaposed within each end of the hollow core of the roller and slide within a channel member that is attached to the inner surface of the rigid roller. The channels have slots in both legs of each channel that receive a retention pin that is attached to the end of each extension bar and about which each extension bar pivots. The extension bars are withdrawn from the center of the rigid tube and fold outward and perpendicular to the axis of the core roller.

When not in use, the extension bars fold back toward themselves and slide back inside the hollow core of the tube. Removable end caps may be placed over the ends of the roller to close each end and to secure the extension bars during transportation. A shoulder strap or a carrying case with shoulder strap may be used to assist with easy transport.

Another exemplary embodiment has extension bars 12 to 24 inches in length that store loosely inside the core roller and may be removed and secured through holes in the exposed ends of the core roller. Swivel brackets allow for a Variable Resistance Module (VRM) or other removable resistance mechanisms, including exercise bands, to be attached to the extension bars for resistance training exercises.

Resistance bands made of flexible resilient material in narrow sheet form may also be connected directly to the ends of the core roller, with the extension bars removed, or to the extension bars for general fitness, Pilates-type, core strengthening, stretching, resistance training, therapeutic or rehabilitative exercises.

An additional exemplary embodiment has a rigid board with a through hole cut out to receive the rigid end of the portable multi-purpose whole body exercise device. The rigid board acts to stabilize the core roller. Holes and notches are provided along the periphery of the board to receive high stretch bands for resistance exercises. The rigid stabilization board could come in various shapes and sizes. Several exemplary embodiments are described.

Other accessories may be provided that could assist the user with exercising as well as for storage and transportation of the device.

One such accessory is stabilizing wedges which fit under the portable multi-purpose whole body exercise device and stabilize the roller while performing exercises. The stabilization wedges would be made of firm material with a flat surface that engages the floor and a semi-circular surface that engages the roller surface to help stabilize the roller during use.

Another accessory is a roller floor stand, which is used to hold the portable multi-purpose whole body exercise device in a vertical position. Certain exercises could be performed with the roller in the vertical position. The floor stand would also allow for easy access with minimal floor space coverage during non-use.

Additional accessories can include a pelvis supporting pad, which can be positioned between the roller and a user to support the pelvic region, and a stability box, which can be provided over the roller to provide a larger and more stable supporting surface for a user to sit or lie upon.

In an alternate embodiment, a removable and storable extension bar is provided, which can be selectively locked in place at an open end of the roller by using a removable and lockable end cap that is inserted into the open end of the roller.

BRIEF DESCRIPTION OF THE DRAWINGS

These and other features, aspects, and advantages of the present invention will become better understood with regard to the following description, appended claims, and accompanying drawings where:

Figure 1:
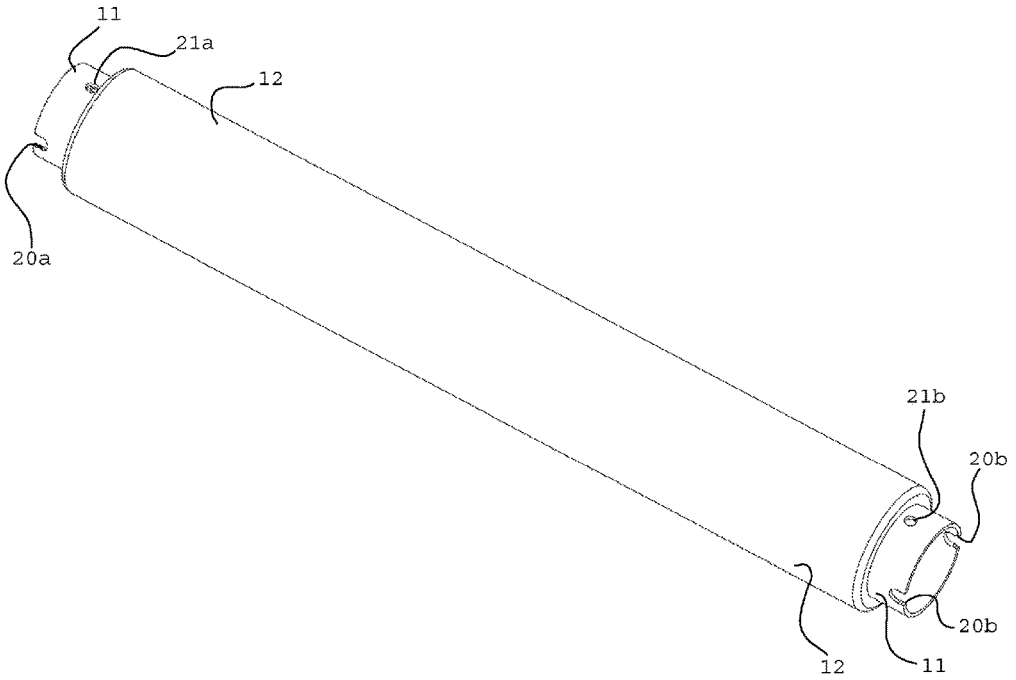
FIG. 1 is a perspective view of the portable multi-purpose whole body exercise device with extension bars stowed.

It should be noted that the drawing figures are not necessarily drawn to scale, but instead are drawn to provide a better understanding of the components thereof, and are not intended to be limiting in scope, but rather to provide exemplary illustrations. It should further be noted that the figures illustrate exemplary embodiments of a portable multi-purpose whole body exercise device and the components thereof, and in no way limit the structures or configurations of a portable multi-purpose whole body exercise device and components thereof according to the present disclosure.

DETAILED DESCRIPTION

A. Context of Various Embodiments

The portable multi-purpose whole body exercise device is designed for use by persons who want to perform general fitness, Pilates-type, core strengthening, therapeutic, and rehabilitative exercises. Some embodiments encompass less than portable features and are designed to be accompaniments for the home, studio or outdoor use. The basic unit is designed to be portable with extending attachments for easy setup and use.

Since there are a large range of human physiques, there is a need for larger size apparatus for individuals greater than 6 feet, 3 inches tall. The larger model would be longer in length and larger in diameter, but would have the same extension and attachment features as the basic device. Additionally, a smaller model could be provided for use by persons of less than average size.

B. Detailed Description of Various Embodiments

The portable multi-purpose whole body exercise device can be utilized in different configurations depending upon which types of exercising or stretching is required. For example, FIG. 1 is a perspective view of the portable multi-purpose whole body exercise device with extension bars in their stored position. The rigid core roller 11 is covered by a resilient covering 12 over the middle outer surface of the roller with the extents (or extruded ends) of the rigid portion 11 exposed. The resilient covering 12 is attached to the outer surface of core 11, and can be changed out after extensive wear. Each end of the rigid core 11 has notches 20 and holes 21 for receiving tension bands and extension bars. The portable multi-purpose whole body exercise device in this configuration can be utilized for general fitness, Pilates, stretching and other exercises typical to a foam roller.

Figure 2:
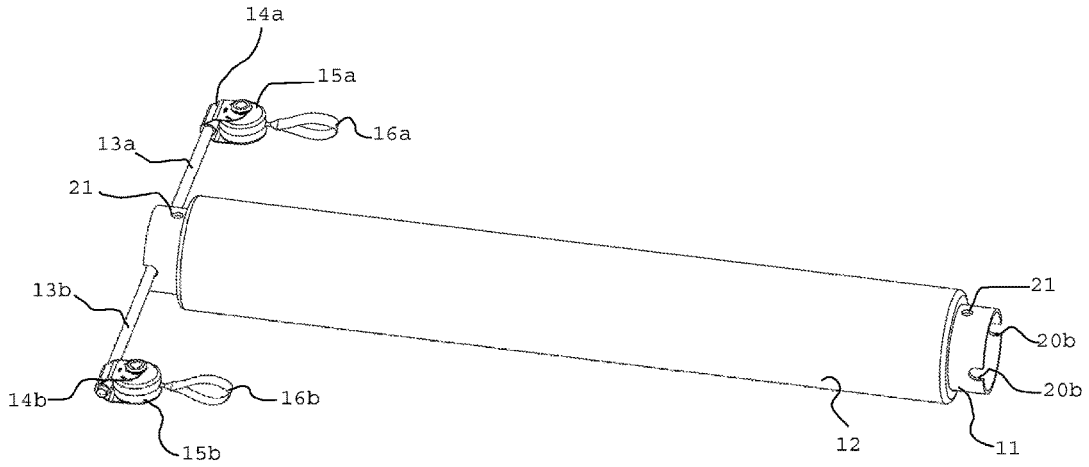
FIG. 2 is a perspective view of the portable multi-purpose whole body exercise device with lateral extension bars extended on one side with swivel bracket for Tension Pulleys, a Weight Load Mechanism, a Variable Resistance Module (VRM) and hand loops.

A side perspective of the portable multi-purpose whole body exercise device with lateral extension bars 13a and 13b extracted on one end of the core roller 11 and nested in notches 20 is shown in FIG. 2. Variable Resistance Modules (VRM) 15a and 15b are attached to extension bars 13a and 13b via the Swivel Bracket 14a and 14b. Hand or foot loops 16a and 16b are connected to a pull cord inside the Variable Resistance Module (VRM) 15a and 15b for resistance exercises. The Variable Resistance Module (VRM) 15a and 15b can be configured to provide selectable incremental resistance in ranges of, for example, 3, 6, and 9 pounds of resistance, or for example, in ranges of 5, 10, and 15 pounds of resistance, or any other suitable incremental weight ranges.

Figure 3:
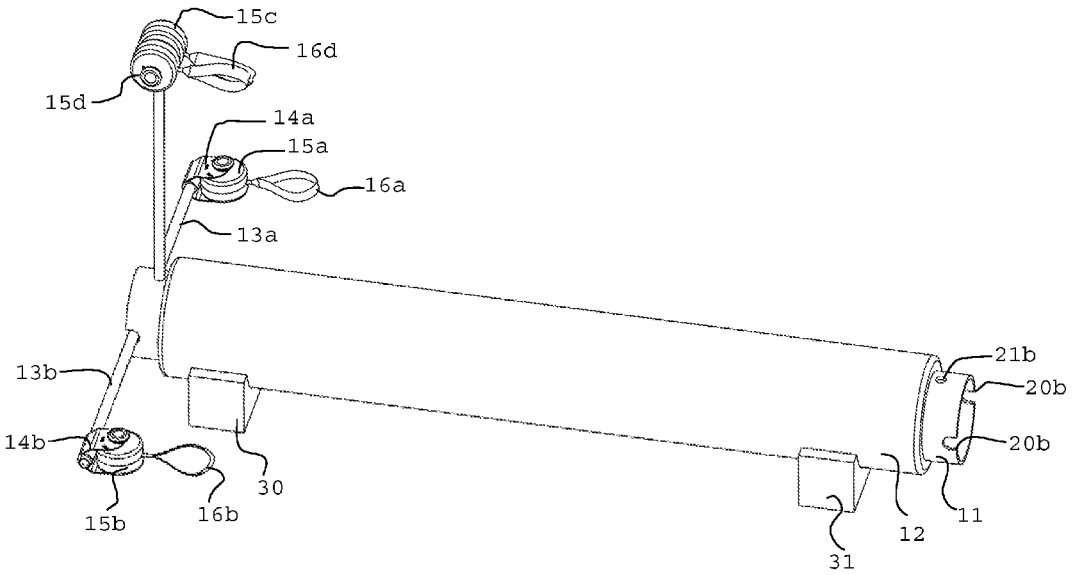
FIG. 3 is a perspective view of the portable multi-purpose whole body exercise device with lateral extension bars extended and vertical extension bar mounted, all shown with swivel bracket for Tension Pulleys, a Weight Load Mechanism or a Variable Resistance Module (VRM) and hand loops, and the use of stabilization wedges.

A side perspective of the portable multi-purpose whole body exercise device with both lateral extension bars 13a and 13b extracted and vertical extension bar 17a placed in hole 21a at one end of the rigid core roller 11 is shown in FIG. 3. Resistance mechanism 15c and 15d are securely attached to vertical extension bar 17a and can be used via hand or foot loops 16c and 16d for overhead strengthening exercises when the user is laying face up lengthwise on top of the core roller with head adjacent to vertical extension bar 17a.

The cylindrical shape of the portable multi-purpose whole body exercise device allows for advanced users to perform exercises with the Variable Resistance Modules (VRM) while balancing on the core roller. For users that are less apt for that level of exercise, stabilization wedges 30 and 31 are provided. These are used to stabilize the roller while lying on the roller lengthwise and using the Tension Pulleys, a Weight Load Mechanism or the Variable Resistance Module (VRM) for strengthening exercises. The wedges can each be formed from a single rectangular block having a generally semi-circular cut out along a longitudinal side thereof to accommodate the circumference of the roller. Alternatively, the wedges can be formed of two mirror image shaped pieces that when placed end to end have the same general configuration of the single block wedge.

Figure 4:
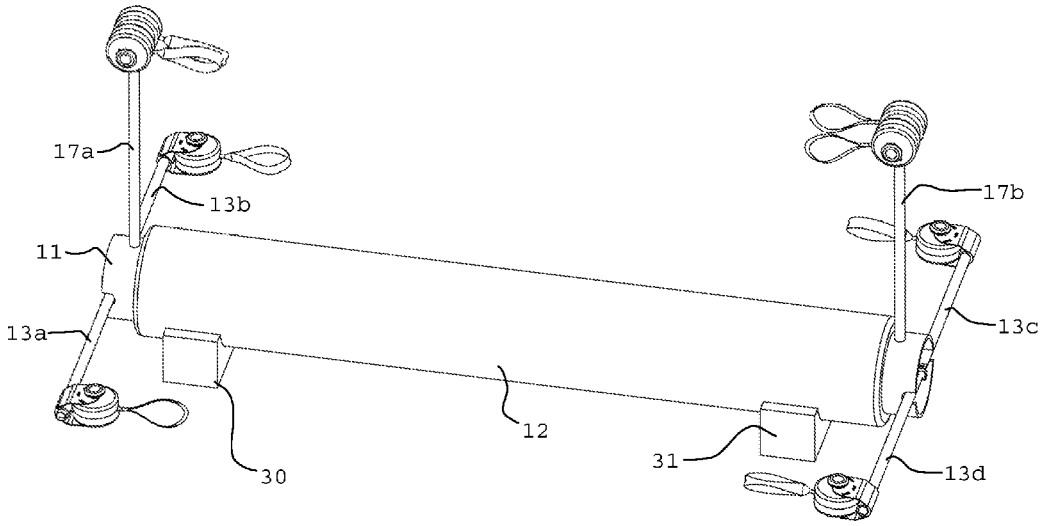
FIG. 4 is a perspective view of the portable multi-purpose whole body exercise device with lateral and vertical extension bars positioned at both ends of the roller, and the use of stabilization wedges.

As shown in FIG. 4, the portable multi-purpose whole body exercise device includes lateral extension bars, 13a, 13b, 13c, 13d, and vertical extension bars, 17a and 17b in position at both ends of portable multi-purpose whole body exercise device. Additionally, stabilization wedges 30 and 31 can be provided to prevent the roller from moving on the supporting surface.

Figure 5:
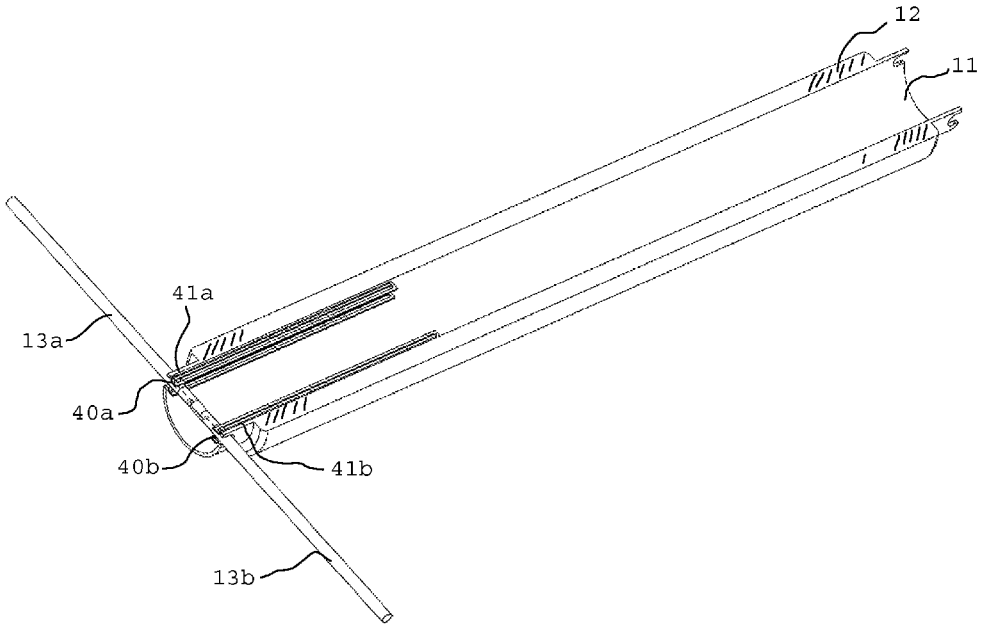
FIG. 5 is a perspective cross section view of the portable multi-purpose whole body exercise device showing the extension bar assembly with the extension bars in an extracted position.

One of the truly unique features to this exemplary embodiment is the storability of the extension bars. FIG. 5 is a perspective cross section view of the portable multi-purpose whole body exercise device showing extension bars 13a and 13b in their extracted position. Extension bars 13a and 13b can slide within channels 40a and 40b, and can be secured to channel 40a and 40b by pins 42a and 42b. Pins 42a and 42b slide in slots 41a and 41b respectively to secure extension bars within the core roller.

Figure 6:
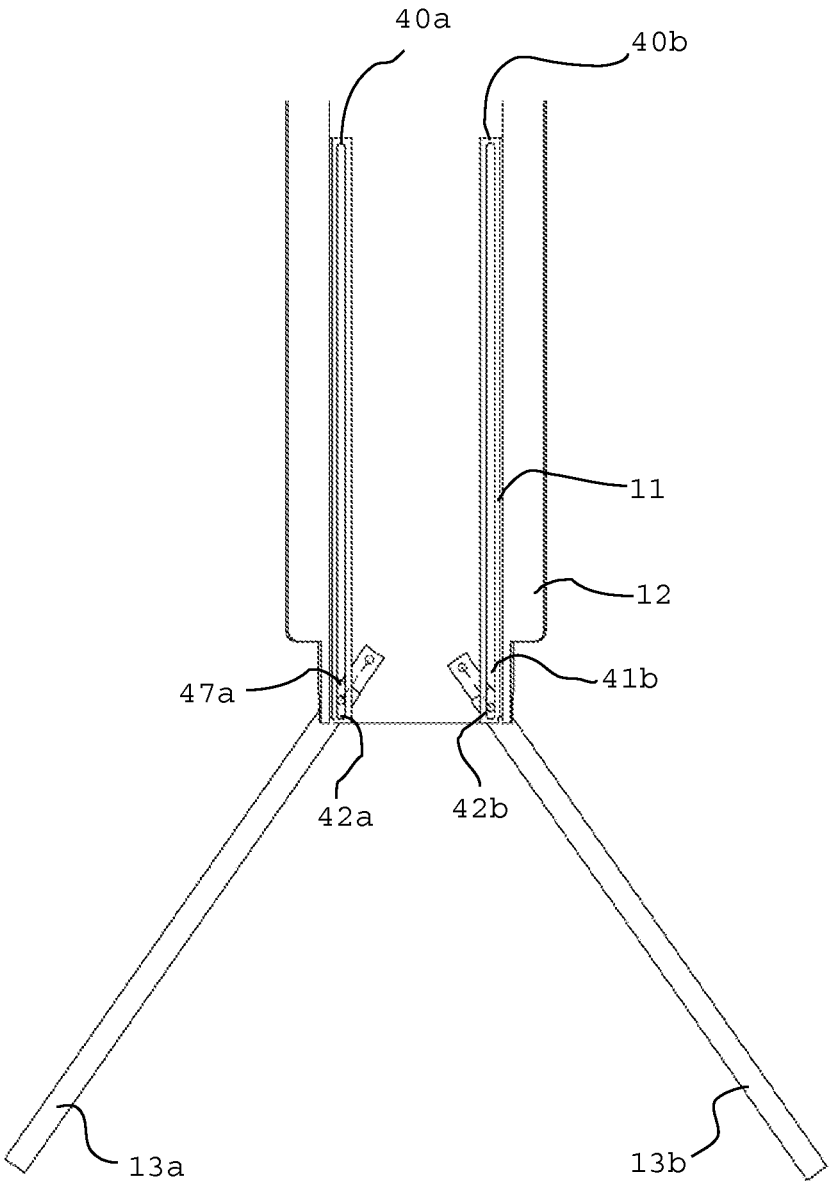
FIG. 6 is a top cross section view of the portable multi-purpose whole body exercise device showing extension bars partially extracted.
Figure 7:
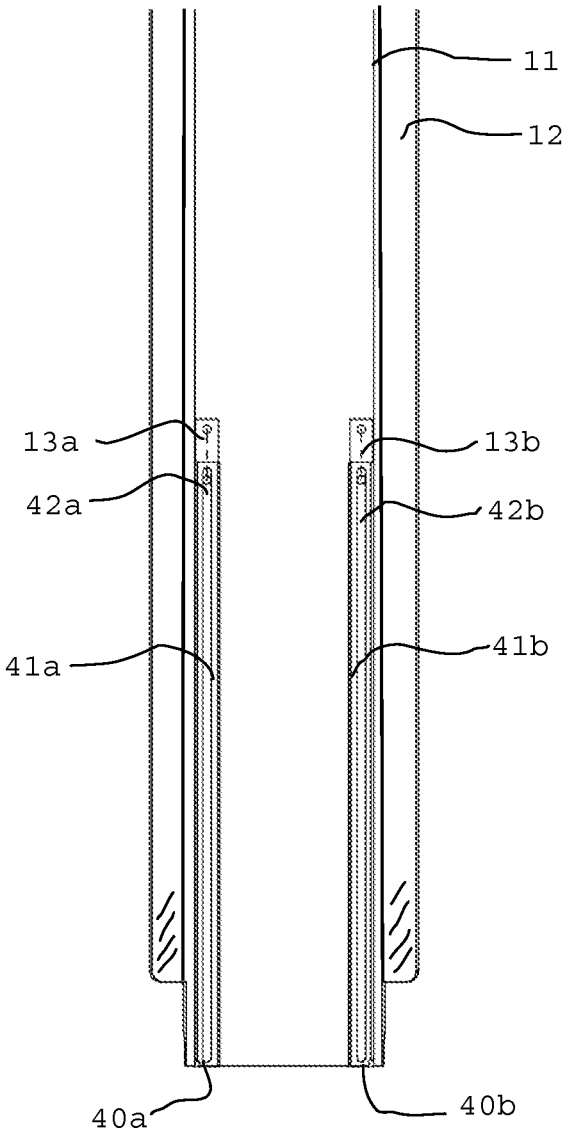
FIG. 7 is a top cross section view of the portable multi-purpose whole body exercise device showing extension bars in their stored position.

FIGS. 6 and 7 are top cross section views showing extension bars 13a and 13b in partially extracted, and fully retracted positions without Swivel Brackets or Tension Pulleys, a Weight Load Mechanism, or a Variable Resistance Module (VRM) attached.

Figure 8:
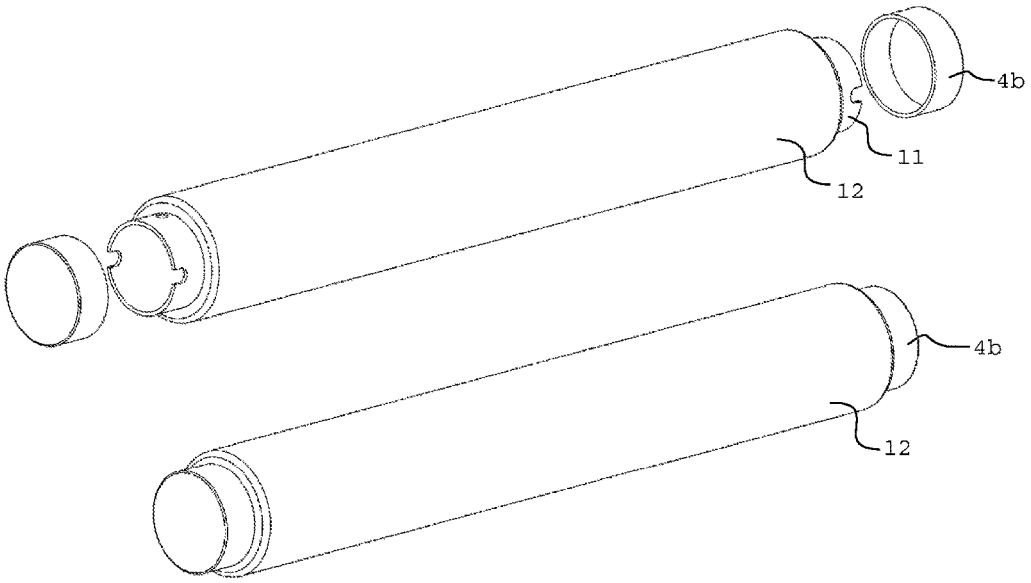
FIG. 8 is a perspective view of the portable multi-purpose whole body exercise device with removable end caps.

FIG. 8 shows the portable multi-purpose whole body exercise device with removable end caps 46 used for storage and transportation of the roller.

Figure 9:
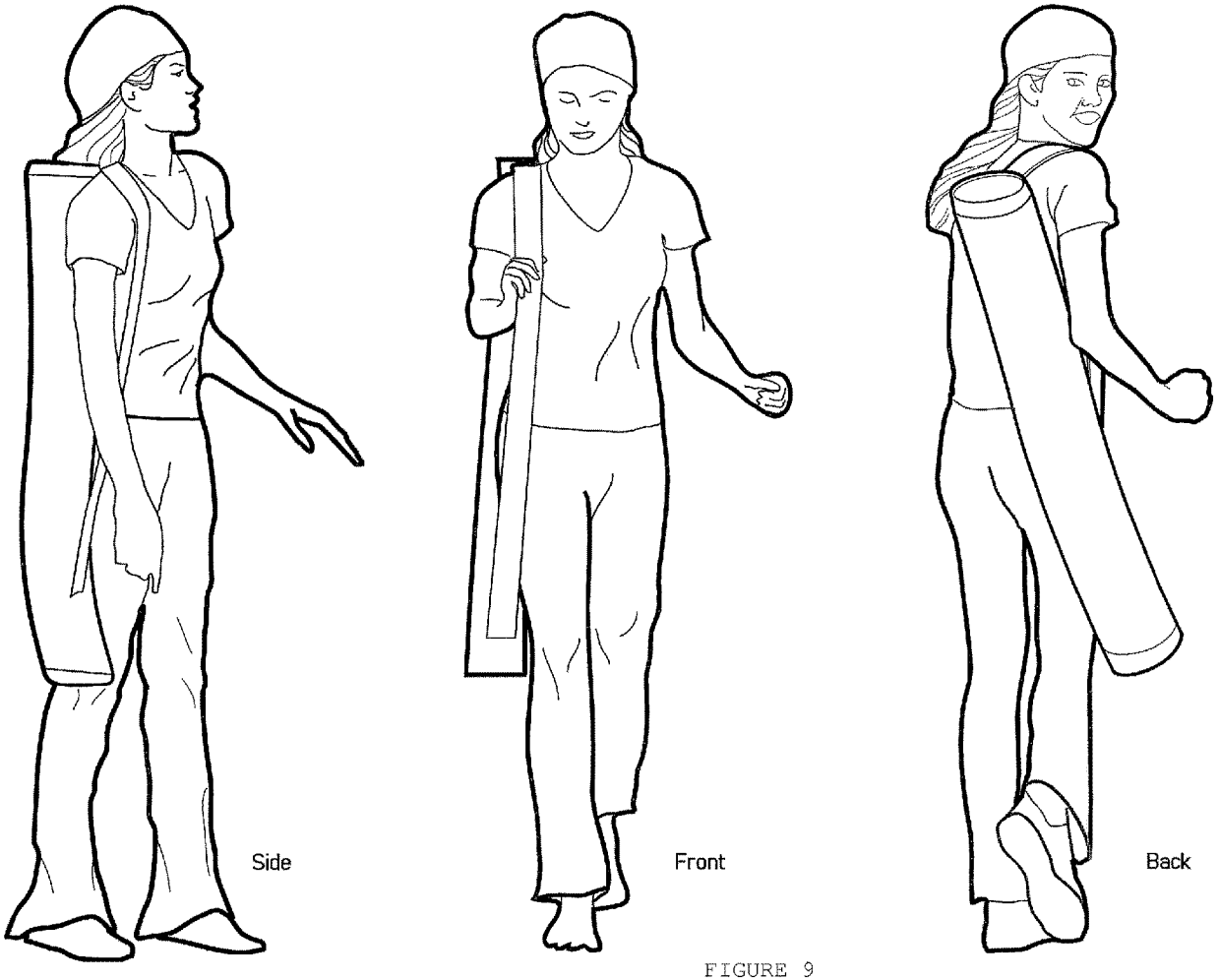
FIG. 9 is a view of the portable multi-purpose whole body exercise device contained in a back pack for transport.
Figure 10A:
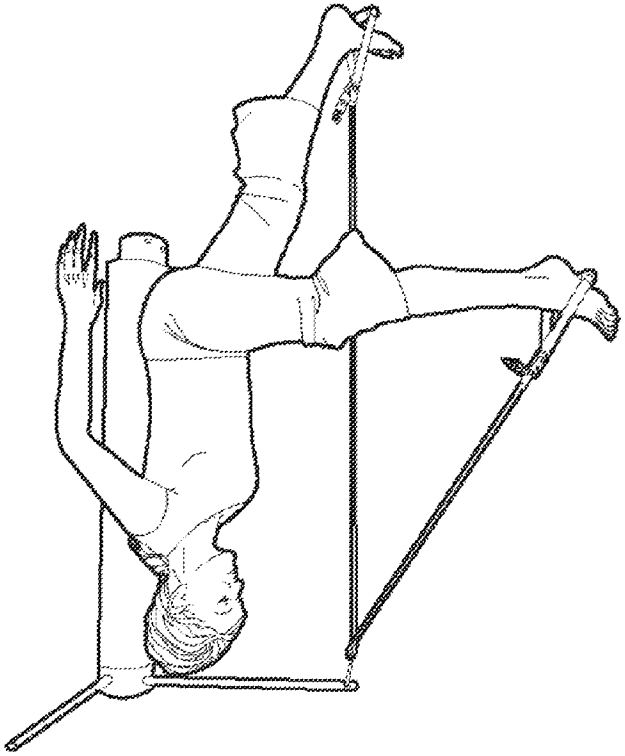
FIG. 10 is examples of six types of exercises that could be performed on the portable multi-purpose whole body exercise device.
Figure 10B:
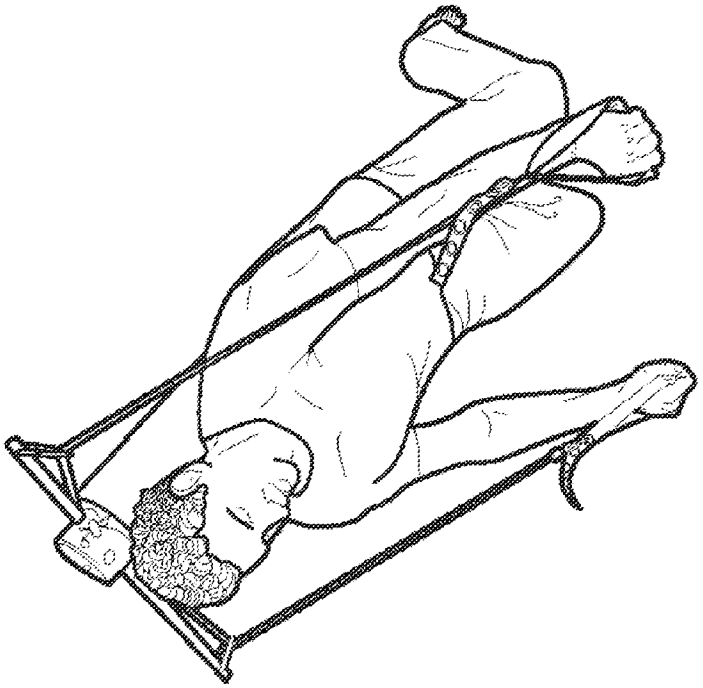
Figure 10C:
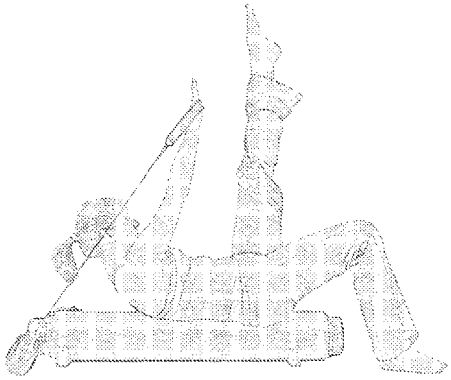
Figure 10D:
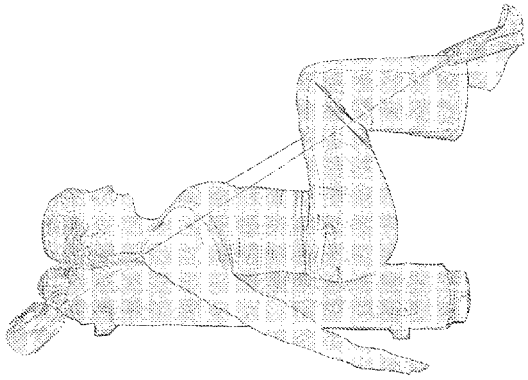
Figure 10E:
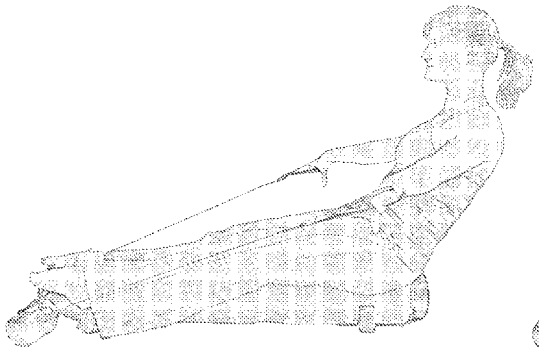
Figure 10F:
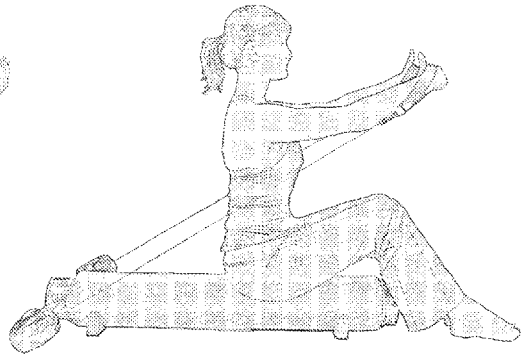
Figure 10G:
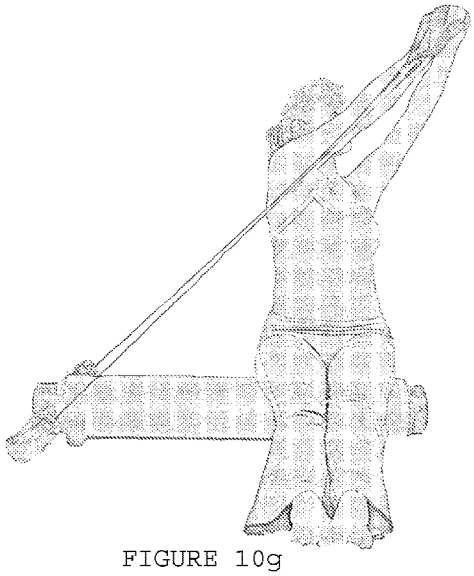
Figure 10H:
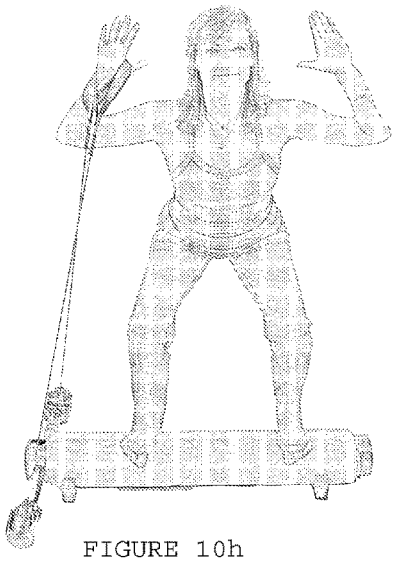

FIG. 9 shows the portable multi-purpose whole body exercise device in a carrying bag for easy transport.

FIGS. 10 a-h show six types of exercise that can be performed on the portable multi-purpose whole body exercise device. For example, a triceps exercise is shown in FIG. 10b, an abdominal/oblique cross exercise is shown in FIG. 10c, a parallel toes exercise is shown in FIG. 10d, a seated row exercise is shown in FIG. 10e, a butterfly ("pec fly") exercise is shown in FIG. 10f, a "seated rotating swing" exercise is shown in FIG. 10g, and a standing squat exercise is shown in FIG. 10h. The inventors envision numerous exercises that can be performed but are not shown here. For example, as listed in Table 1, various types of warm up exercises, stretches, sport specific exercises (for example golf or tennis swing exercises), and general fitness exercises can be performed.

TABLE 1

| Exercise Type | Description |
|---|---|
| Warm Up #1: | Roll Down<br>Bend and Strengthen Knees<br>Come to Knees<br>Round and Stretch - Cat stretch |

TABLE 1-continued

| Exercise Type | Description |
|---|---|
| | Cross and Swivel to back to roller |
| | Option #1 Bent Knees |
| | Option #2 Straight Knees |
| | Roll Back |
| | Bend Knees |
| | Basic Ab Curl |
| | Ab Curl with Rotation |
| Warm Up #2: | Roll Down to pyramid |
| | Leg Switches |
| | Pyramid with Roll back |
| | Bend knees to roll over to |
| | Ankles on Roller to |
| | Roll Back |
| | Full Roll Ups |
| | Option #1 Spine Twist |
| | Option #2 Pendulum |
| | Single Leg taps (Includes chest lift) |
| | Single Leg Tap with rotation |
| | Option #1 Bent Knee |
| | Option #2 Straight Leg |
| Miscellaneous: | Teaser prep sitting |
| | Ab Qui sitting |
| | Oblique curl sitting |
| | Tilt |
| | Round-about |
| | Ab-punches - Sitting, standing |
| | Pec fly and pec press - Sitting, standing, supine |
| | Single arm pec fly |
| | Single arm pec press |
| | Up Pulses Abs - oblique slide with long arms |
| | Down Pulse Abs |
| | Half circle abs w/arms |
| | Split squat biceps |
| | Split squat shoulders |
| | Split squat hammer curl |
| | Standing cross deltoid pull |
| | Standing chest expansion |
| | Standing leg extension |
| | Side-line leg press |
| | Side-line clamshells |
| | Side-line oblique twist |
| | Kneeling arm series |
| | Side-line oblique reach/posterior deltoid reach |
| | Side-line oblique crunch |
| | Side-line oblique crunch with leg extension/retraction |
| | Single Leg crosses with low back on roller |
| Side Sitting: | Beg |
| | Adduction |
| | Abduction |
| | Push and pull |
| | Arms |
| | Cross pull bent arm |
| | Cross pull straight arm |
| | Triceps |
| | Rotation |
| | Swing |
| | External Rotation |
| | Internal Rotation |
| Side Lying: | Butt Buster Series/Side Plank |
| | Single leg |
| | Leg Extension |
| | Single leg circles |
| | Mermaid |
| | Superman |
| | Swan |
| Sports: | Tennis: |
| | Underhand |
| | Backhand |
| | Overhead Serve |
| | Basketball |
| | Jumpshot |
| | Golf |
| | Swing - Standing, Side Lying, Sitting |
| | Standing side: |
| | Squats-golf swing |

TABLE 1-continued

| Exercise Type | Description |
|---|---|
| Perpendicular to Roller: (Lateral Flexion end of series) | Mermaid series |
| | Mermaid with pushups |
| | Mermaid with ab crunch |
| | Mermaid with back/single arm back pulses |
| | Superman with lifted arms |
| | Back Extension |
| | Side - single leg series |
| | Plank - with trunk rotation |
| | Side plank - with leg in |
| | Pushups |
| | Tricep pushup |
| | Balance Hinges |
| | Dancer Balance Beam Series |
| | Walking - front and back |
| Standing facing extension arm: | Arms: |
| | Mid row |
| | Rear deltoid |
| | Biceps |
| | Chest extension |
| | Anterior Deltoid |
| | Medial Deltoid |
| | Single Arm |
| | Double Arm |
| | With Rotation of Arms |
| | Standing Hundred |
| | Lunge with rotation |
| | Standing hip work: |
| | Extension |
| | Extension with external rotation |
| | Attitude |
| | Circles |
| | Step up |
| | Side Step |
| | Mini squats - single leg |
| | Full single leg squat |
| | Hip extension neutral and extension rotation |
| | Hip hike |
| | Curtsey lunge |
| | Rear walking |
| | Circles |
| | Full ½ circle with adductor |
| | Donkey kicks |
| | See Saw |
| | Clock |
| | Split lunge chest expansion |
| | Squat |
| | Biceps |
| | Goal post |
| | Back extension reach squat |
| | Calf raises + extension rotation in arms |
| | Bent elbow |
| | Straight Elbow |
| | Prances |
| | 3 lb only feet around roller inner thigh "on" |
| | Arm series |
| | Parallel feet |
| | Extension rotation feet |
| | "Swami" |
| | Sitting facing Chest Exp. Wrists, rolling wrists |
| extension arm: | Biceps/biceps with one arm, then switch |
| Both Arms/ One Arm | Triceps |
| | Rowing Back 1 Leg position |
| | 1, 2, 3, 4 etc. |
| | Stand and row Foot position |
| | 1, 2, 3, 4 etc. |
| | Row with rotation Changing leg positions |
| | Deltoids from strap tape |
| | Cross pull |
| | Cross pull bent elbows |
| | Ab |
| | Basic mini rollups |
| | With arms reaching |
| | With rotation |
| | Pike Prep |
| | Pike sitting |
| | One arm/both arms |
| | Pike one leg sitting |
| | Teaser prep with arms in straps |

TABLE 1-continued

| Exercise Type | Description |
|---|---|
| Stretches-Do in both sitting directions to assist | Spine stretch sitting |
| | Spine stretch with one arm and rotation |
| | Spinal rotation/hands clasped |
| | Spine twist with arms in goalpost/straight arms |
| | The saw |
| | Thigh stretch kneeling with straps |
| | External rotation with shoulder |
| | With rotation of body |
| | Straight arms to bent arms |
| | Rear deltoid, tricep press kneeling |
| | Triceps deltoids with back extension into wide V |
| | Bend arms, straight arms |
| Different positions with legs and feet on the roller: | Butterfly position, cross legged, one leg straight, one leg bent, etc. |
| | Balance series: Cross legged, butterfly, etc. both arms in straps raising arms high to low, side to side. |
| Kneeling on roller: Prone facing VRM: | Kickbacks |
| | Leg Extension |
| | Lateral leg extension |
| | External rotation |
| | Internal rotation with opposite strap on foot. |
| | Straps on knees/legs for froggie back, fife hydrants etc. |
| Sitting facing away from extension arm: | Punching - Round back |
| | Upper cut |
| | Prep |
| | Jab |
| | Speed bag |
| | Fly |
| | Shoulders |
| | Triceps |
| | Back extension - Straddle kneeling over roller |
| | Child's pose |
| | Shoulder push |
| | Breast stroke prep |
| | Abs sitting - |
| | Full roll up - Feet Down |
| | Crunches - Feet up progression |
| | Round back abs series — Straight arms and legs |
| | Variation arms |
| | Variation legs |
| | Supine and sitting |
| | Articulation abs series |
| | Teaser prep |
| | Teaser prep 1 leg |
| Kneeling facing extension arm: | Single leg |
| | Kick back |
| | Straight leg lift |
| | Bent knee extension |
| | Lateral adduction |
| | Kneeling (crunch) |
| Double Kneel Feet on roller toes/feet off roller | Chest Exp |
| | Delts |
| | Lateral row |
| | Cross arm delt pull |
| | Rotation pull |
| | Thigh stretch |
| | Pelvic tuck |
| Kneeling facing away from extension arm | Hamstring lift |
| | Heel to glute |
| | Single leg straight lift |
| | Reverse single leg curl |
| | Pyramid with leg lift |
| | Push up with leg lift |
| | Cross body pull |
| | Arm circles |
| | Triceps |
| Supine Perpendicular | Shoulders on roller |
| | Chest Lift |
| | Chest Lift with leg extension |
| | Add oblique twist |
| | Hips on side |
| | 2 (sides) corkscrew both feet |
| | Reverse curl |

TABLE 1-continued

| Exercise Type | Description |
|---|---|
| | Roll over |
| | (adduction) single |
| | Ab series |
| | Bridge |
| Supine Parallel to Roller: | Bicycle |
| | Single leg hip series - Circles |
| | Walking |
| | Frog |
| | Reverse Crunch |
| | Adductor |
| | Double leg circles |
| | Short spine |
| | Footwork |
| | Toe prances |
| | Toe Taps |
| | Calves |

As can be seen from the exemplary exercises listed in Table 1, the numerous accessories, which can and do fit within the core of the roller to increase the portability of the exercise device, and the numerous configurations of exemplary embodiments of the portable exercise device provide an increased number of exercise options that can be performed using the exercise device, and thus add to the versatility of the basic device.

Figure 11A:
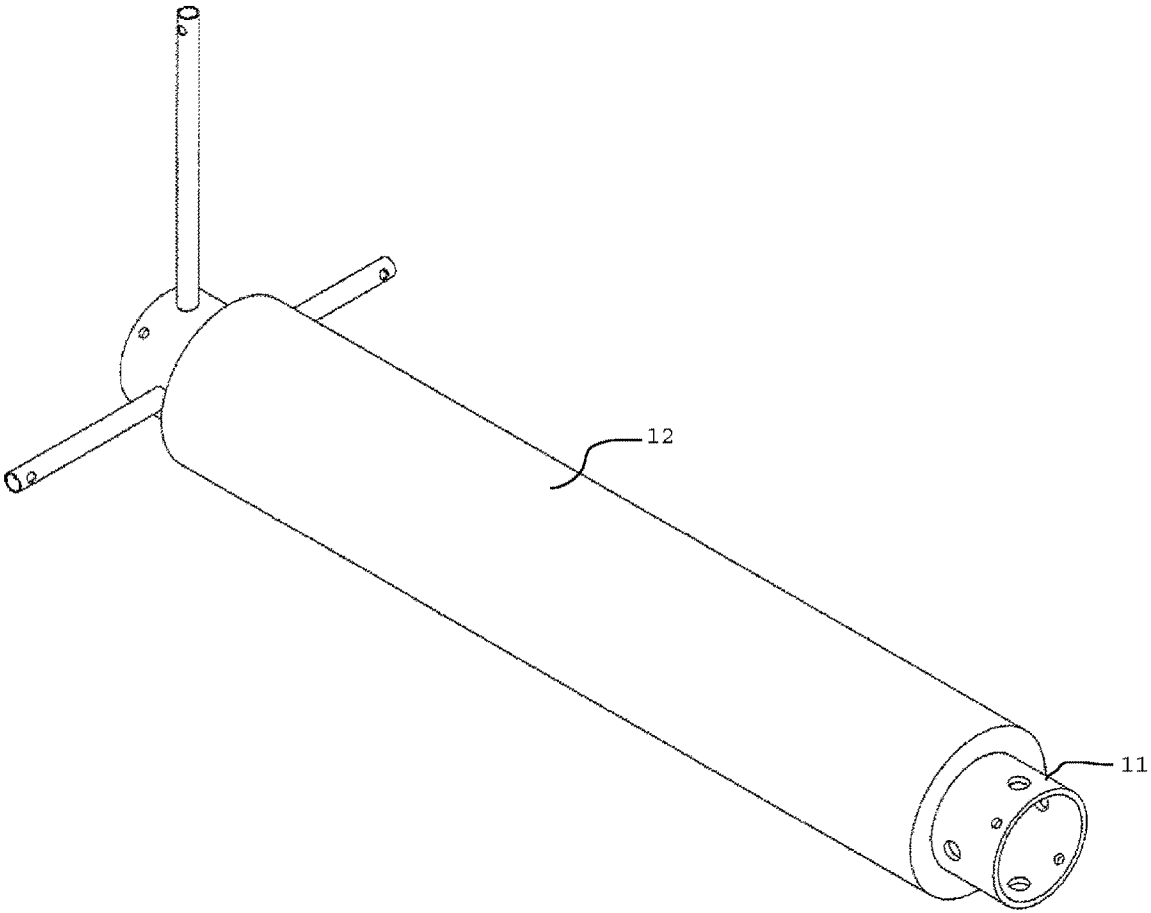
FIG. 11a is a perspective view of the portable multi-purpose whole body exercise device with detachable extension rods placed at one end of the roller.

Other embodiments that have been envisioned by the inventors are also provided. One such embodiment is in FIG. 11a which includes extension bars that are stored loosely inside the core roller, removed and placed in holes at the end of the rigid core roller. Tension bands may be secured to holes in the ends of the extension bars for resistance exercises.

Figure 11B:
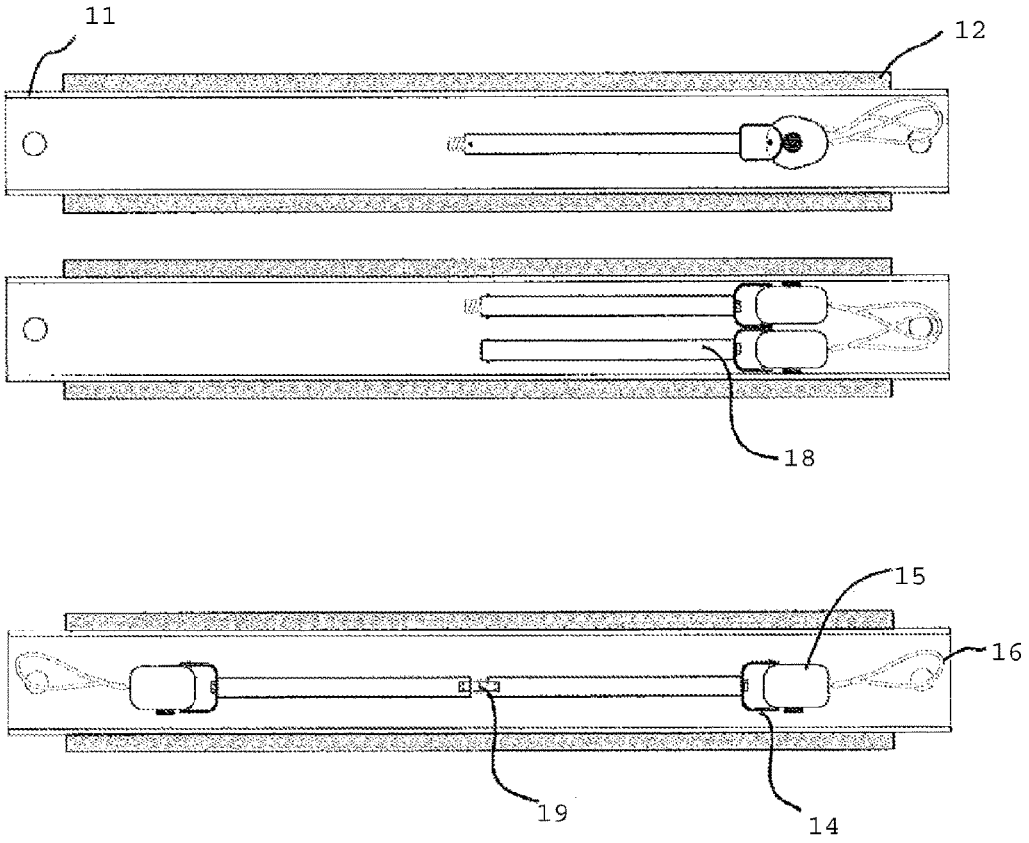
FIG. 11b is a top cross section view of the portable multi-purpose whole body exercise device with detachable extension rods shown with a swivel bracket and a Variable Resistance Module (VRM) shown in their possible stored locations.

FIG. 11b shows extension bars with Swivel Brackets and Variable Resistance Modules shown in various storage positions inside the core roller.

Figure 12:
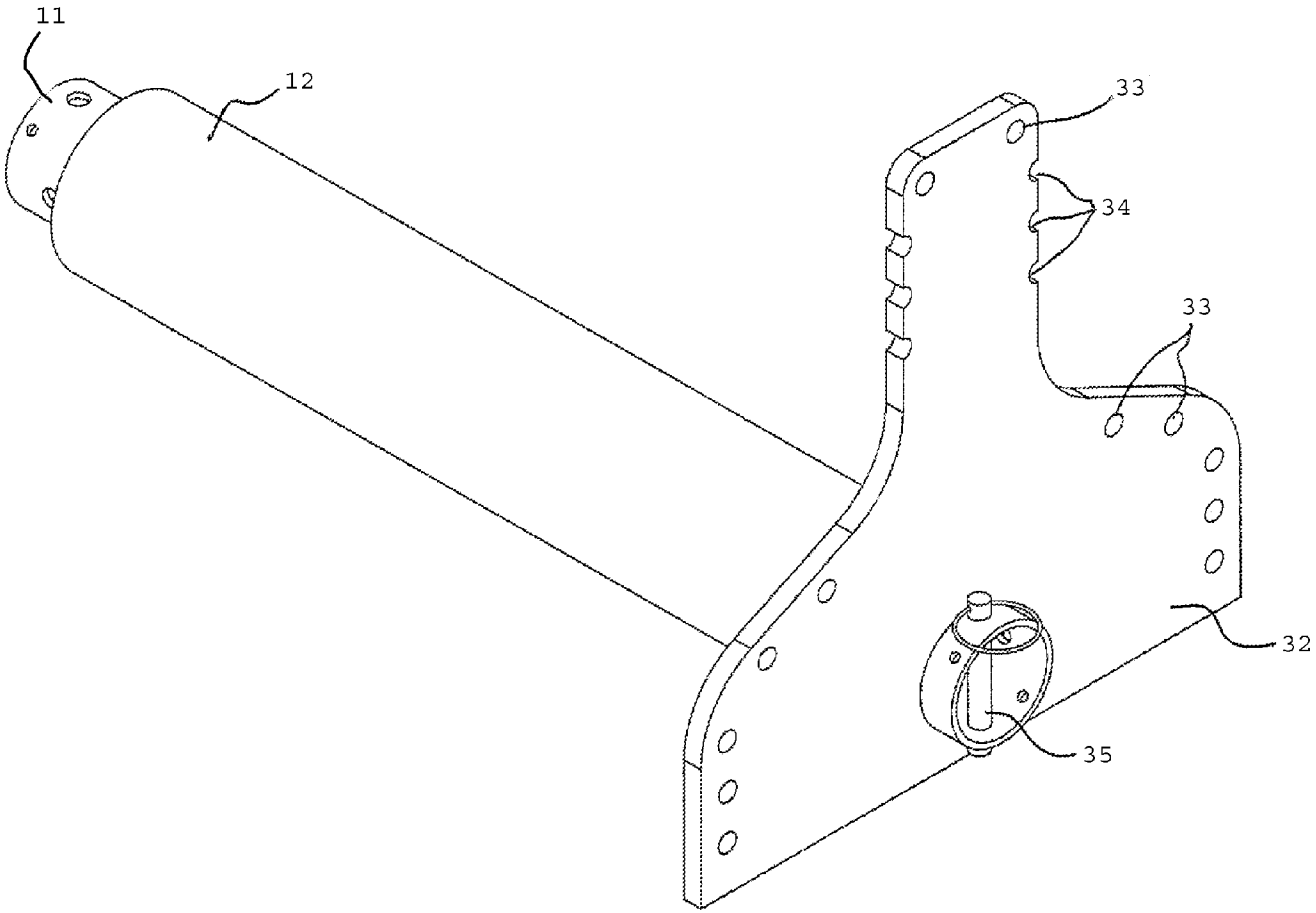
FIG. 12 is a perspective view of the portable multi-purpose whole body exercise device attached to a stabilization board.

Another embodiment shown in FIG. 12 is a stabilization board 32 with a hole cut out to receive one of the rigid end portions of the portable multi-purpose whole body exercise device, and can be used to assist in supplying additional stabilization of the roller during use. Tension bands may be placed in holes 33 or secured around the back of the stabilization and engage with notches 34 on said stabilization board for additional resistance exercises.

The shape of the stabilization board 32 in FIG. 12 can vary to be rectangular or even circular with a flat edge that engages the floor during use. Retaining pin 35 placed in hole 21 on the end of the rigid core would keep the stabilization board from sliding off the end of the rigid core roller 11 during use.

Figure 13:
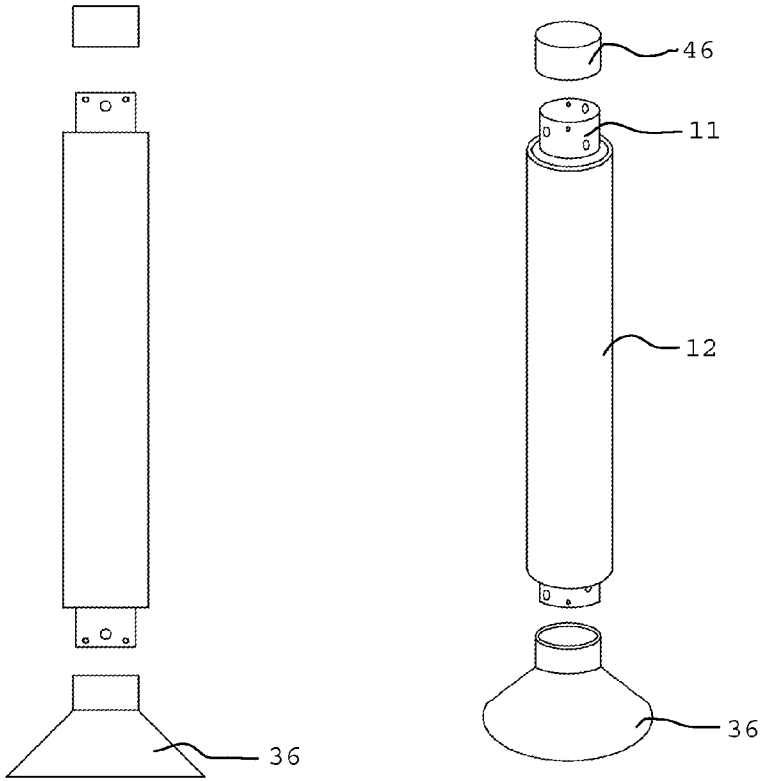
FIG. 13 and FIG. 14 are perspective views of the floor stand and the portable multi-purpose whole body exercise device.
Figure 14:
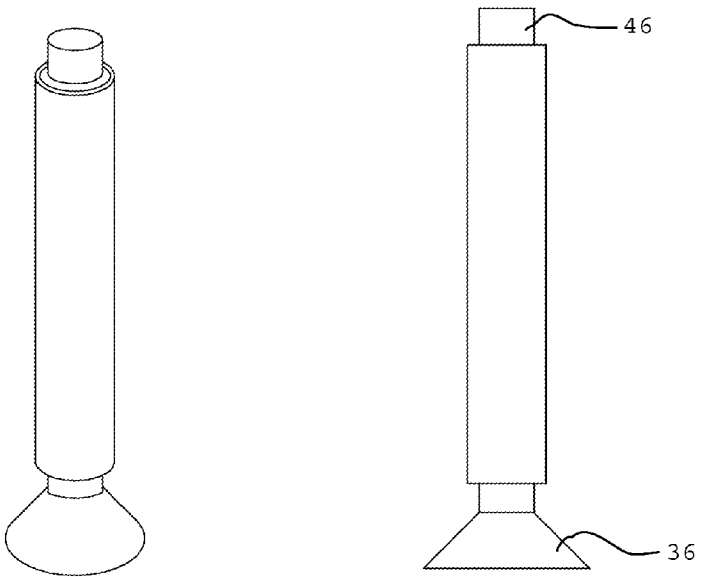

Another accessory is shown in FIG. 13 and FIG. 14. A floor stand 36 may be employed to hold the portable multi-purpose whole body exercise device vertical for use with certain types of exercise or to simply store the exercise device while taking up less floor space.

Figure 15A:
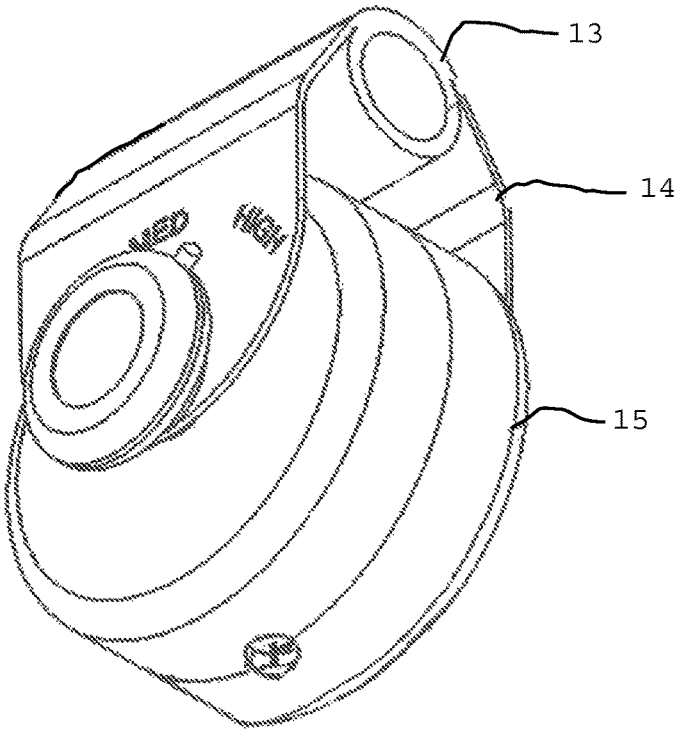
FIG. 15a is perspective view of a Variable Resistance Module (VRM) attached to the swivel bracket.

In another exemplary embodiment, FIG. 15a shows a perspective view of the Swivel Bracket 14 attached to the Variable Resistance Module 15, including the resistance changing knob.

Figure 15B:
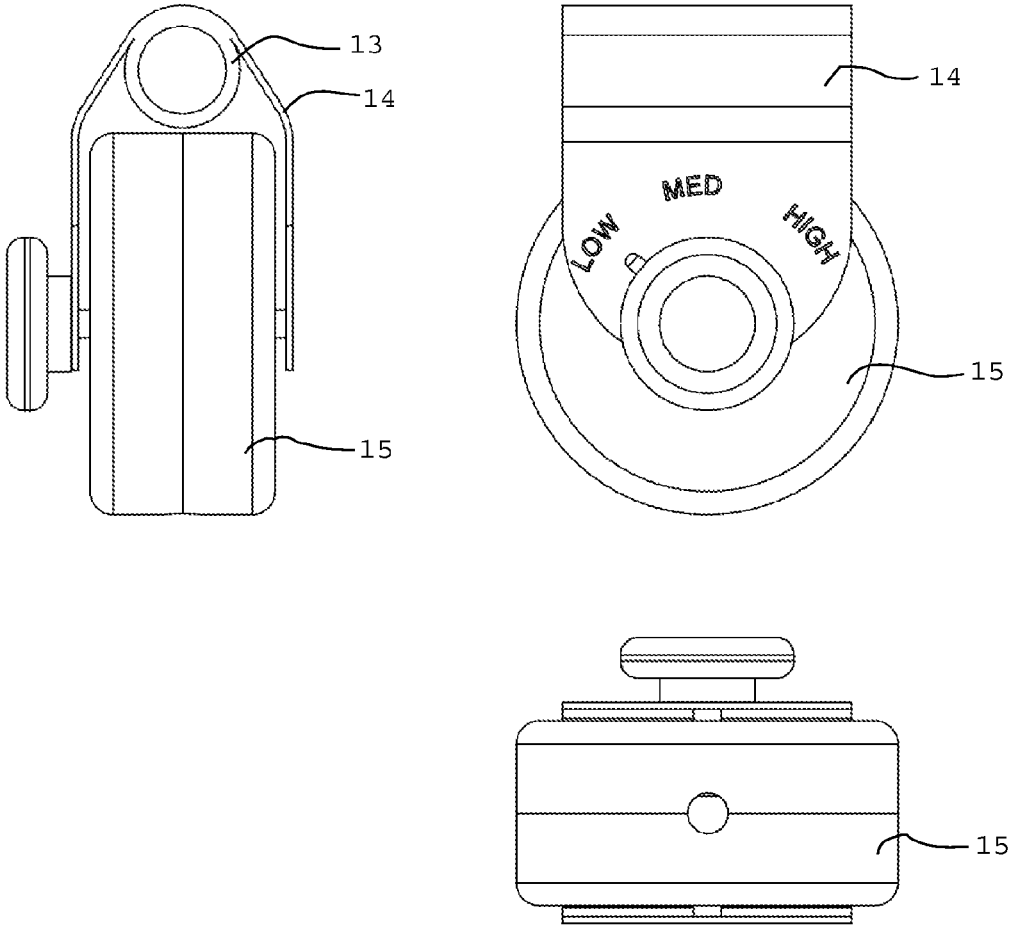
FIG. 15b is a front, side & bottom view of the Variable Resistance Module (VRM) attached to the swivel bracket.

FIG. 15b shows a front, side & bottom view of the Swivel Bracket 14 attached to the Variable Resistance Module 15.

C. Alternate Embodiments

An alternate embodiment of the portable multi-purpose whole body exercise device is shown in FIGS. 16-21b. In this embodiment, which has substantially similar construction to previously described embodiments, a rigid core roller 50 having an interchangeable resilient covering 52 is provided.

Figure 16:
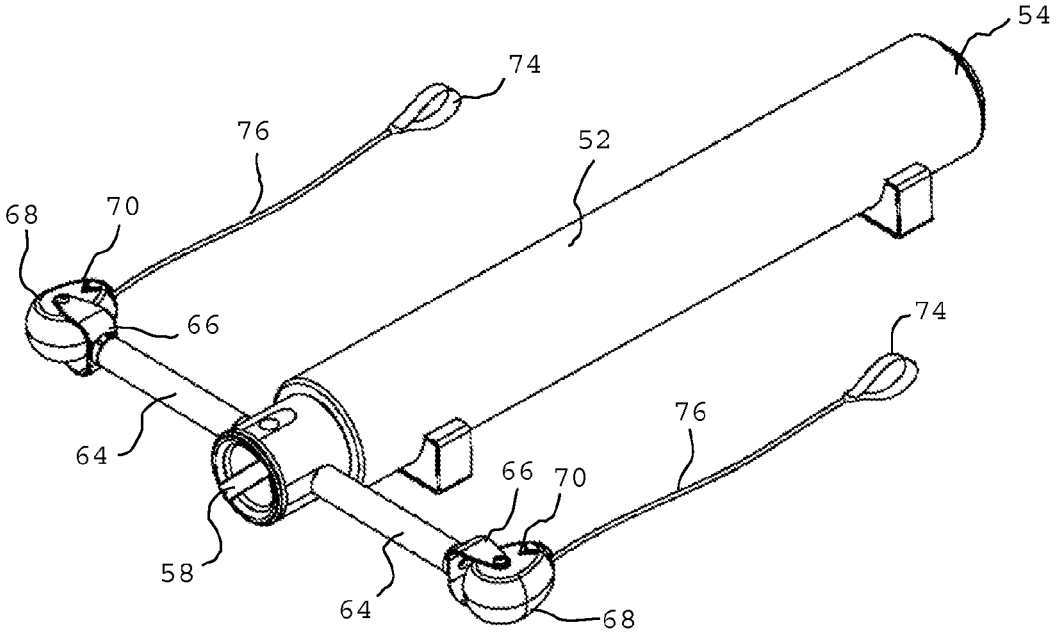
FIG. 16 is a perspective view of an exemplary embodiment of the portable multi-purpose whole body exercise device.

As seen in FIG. 16, the rigid core roller 50 has extruded (open) ends that extend beyond the ends of the resilient covering 52 in the longitudinal direction thereof. One open end of the rigid roller 50 can be closed by a dummy cap 54 that is not intended to be easily removed. The dummy cap 54 can be integrally formed with the roller 50, or may be separately formed, and may be generally permanently attached to the open end of the roller, for example, by adhesive bonding or by rivets. The other open end 56 of the rigid roller 50 can be selectively closed by a removable and lockable cap 58.

Figure 18A:
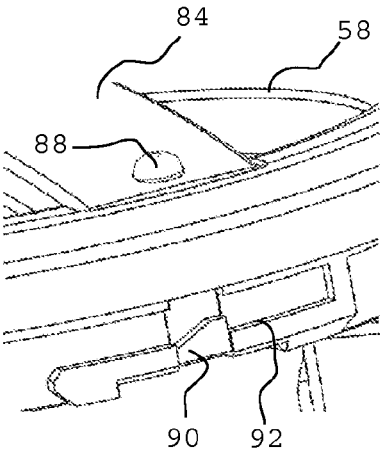
FIGS. 18a and 18b are partial perspective views of the locking mechanism of the removable and lockable end cap of the embodiment of the portable multi-purpose whole body exercise device shown in FIG. 16.
Figure 18B:
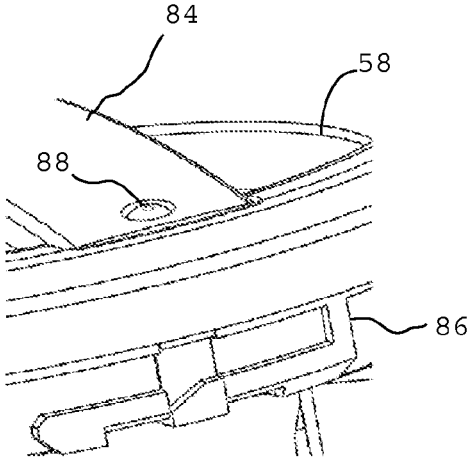
Figure 17:
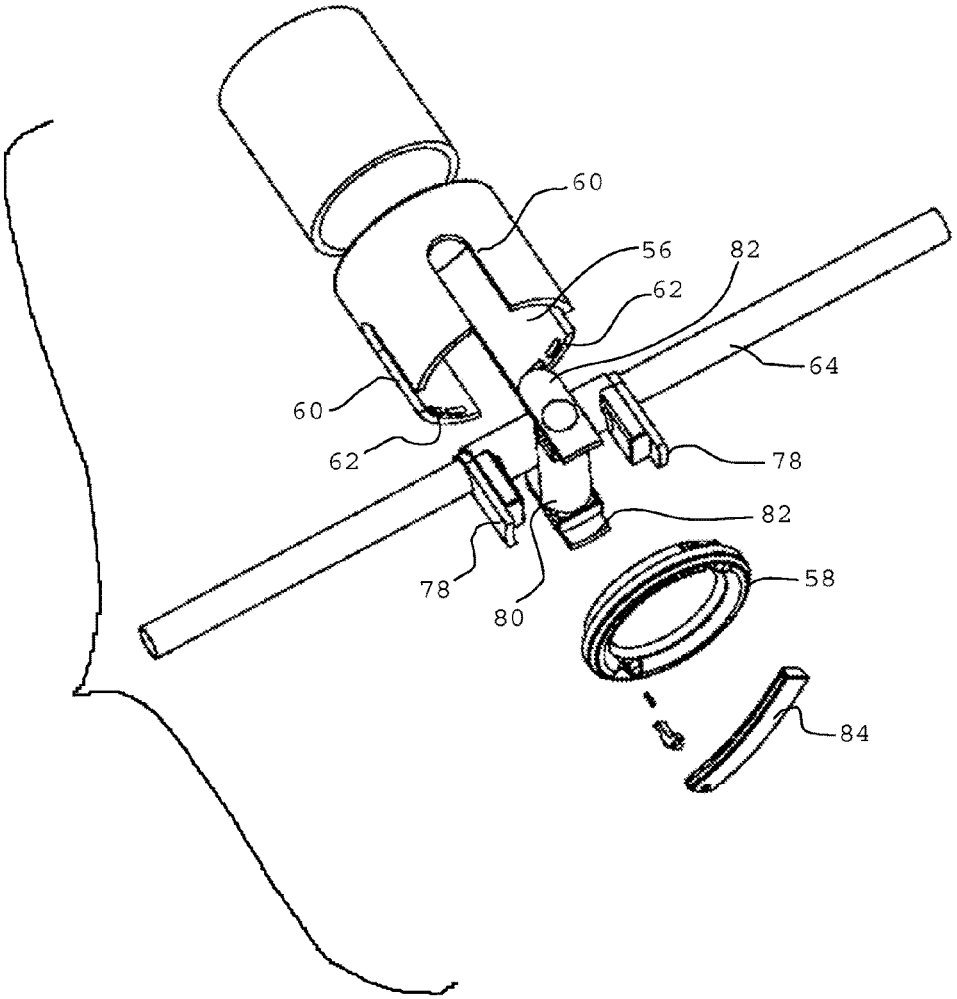
FIG. 17 is a partial perspective exploded view of a removable and lockable end cap for one end of the embodiment of the portable multi-purpose whole body exercise device shown in FIG. 16.

The details of the removable and lockable cap 58 closing the open end of the roller 50 are shown in FIGS. 17-18b, and will be further discussed below.

A removable extension bar 64 is furnished for positioning at the open end 56 of the roller 50 so as to provide perpendicular extension arms that extend away from the body of the roller. A clevis 66 and Variable Resistance Module (VRM) 68 are provided at respective ends of the extension bar 64. A hand or foot loop 74 is connected to a cable or cord 76 that is wound within the Variable Resistance Module (VRM) 68, so as to provide resistance to a user's hand or foot that grasps or is inserted into the hand or foot loop 74. In this manner, the portable multi-purpose whole body exercise device can be used for any multitude of previously described exercises.

Figure 19:
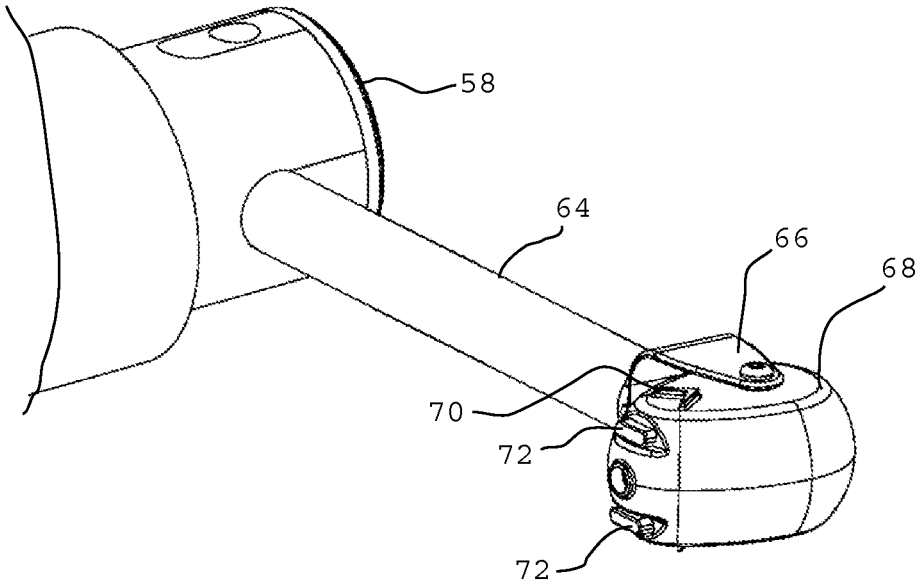
FIG. 19 is a partial perspective view of a swivel bracket (clevis) and Variable Resistance Module (VRM) attached to one of the extension arms of the embodiment of the portable multi-purpose whole body exercise device shown in FIG. 16.
Figure 20:
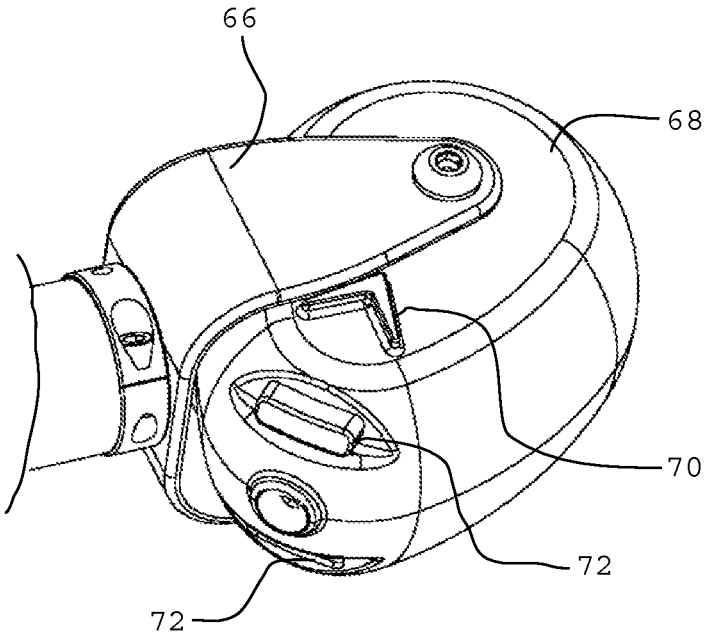
FIG. 20 is a partial perspective view showing the clevis and Variable Resistance Module (VRM) of FIG. 19 with a rotation stop in an engaged and stopped orientation.

As best seen in FIGS. 19 and 20, the Variable Resistance Module (VRM) 68 can rotate within the clevis 66 through almost 360 degrees, and is only limited in the angle of rotation by a rotation stopper portion 70 provided on the casing of the Variable Resistance Module (VRM) 68, which selectively engages the supporting arms of the clevis 66 to prevent complete, uninterrupted rotation of the Variable Resistance Module (VRM) 68. The rotation stopper portion 70 can be configured in a generally raised V-shape such that one side of the V-shaped rotation stopper 70 selectively engages one side of the arm of the clevis 66 to prevent rotation in one direction, and the other side of the V-shaped rotation stopper 70 selectively engages the other side of the arm of the clevis 66 to prevent rotation in the opposite direction. Thus, the selective engagement of the V-shaped rotation stopper 70 with the arm of the clevis prevents rotation of the Variable Resistance Module (VRM) 68 in a complete circle.

As can be seen best in FIG. 19, the Variable Resistance Module (VRM) 68 also include two resistance selection buttons 72. As previously mentioned, the Variable Resistance Module (VRM) 68 can provide three distinct incremented resistances. When neither of the two resistance selection buttons 72 are pressed in, a first, least amount of resistance is provided. When one of the two resistance selection buttons 72 is pressed in, a second, intermediate resistance is provided. A third, maximum resistance is provided when both of the resistance selection buttons 72 is pressed in.

The variable resistance is accomplished by way of multiple spring resistance members provided within the Variable Resistance Module (VRM) 68, which selective ones of the multiple spring resistance members are engaged to resist rotation and unwinding of the cable or cord 76 when the different resistance selection buttons 72 are pressed in. The internal pulley that the cable or cord 76 is wound upon can be biased to automatically wind the cable or cord 76 when a pulling force applied by the user to the cable or cord 76 is released.

The inner components of the Variable Resistance Module (VRM) 68 are best shown in FIGS. 21, 22a, 22b, 23a, 23b, 24a, 24b, and 25. The resistance selection mechanism is the same for both resistance selection buttons 72, and thus, the description below of one resistance selection button 72 is applicable to both resistance selection buttons 72.

Figure 21:
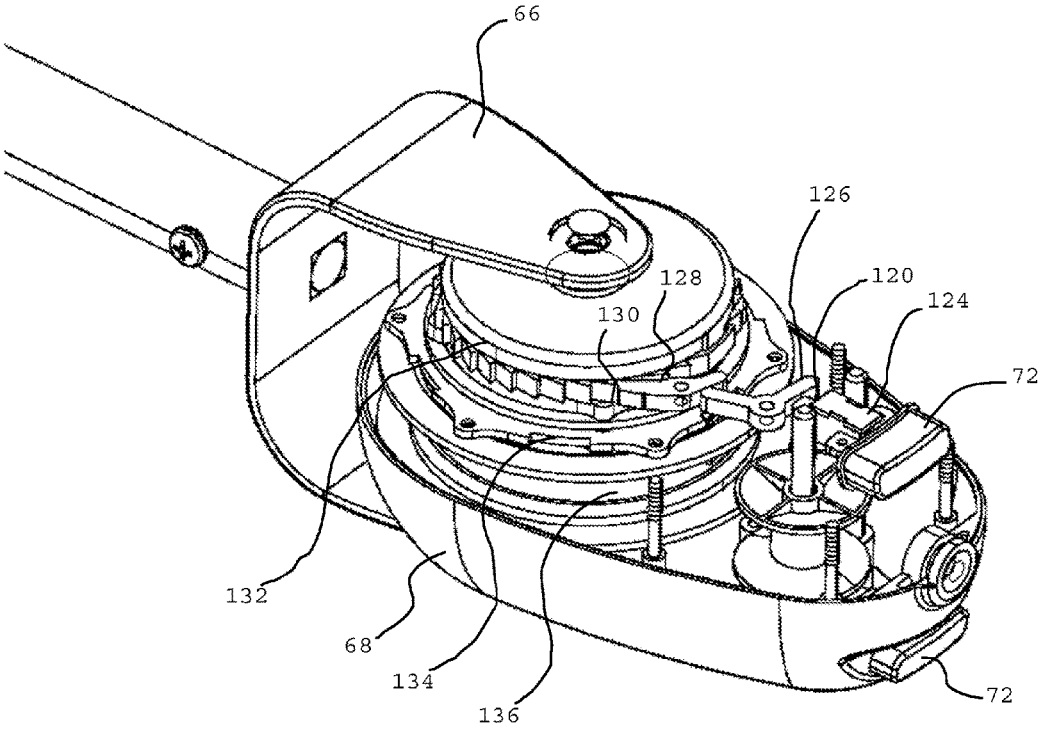
FIG. 21 is a perspective view of the Variable Resistance Module (VRM) with one half of the cover removed to show the inner components thereof.
Figure 22A:
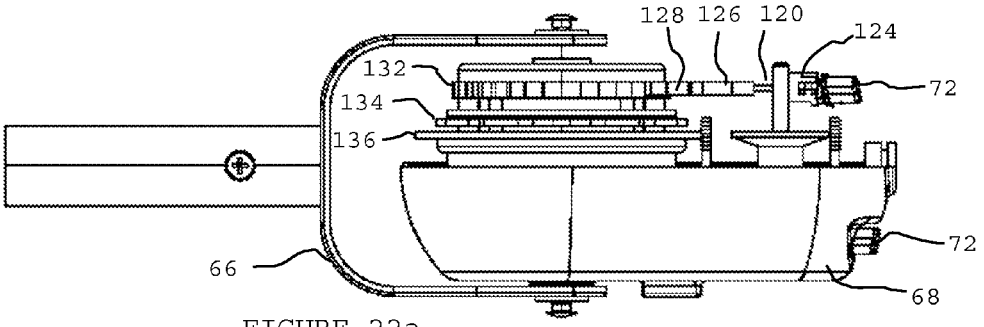
FIGS. 22a and 22b are side and top views, respectively, of the Variable Resistance Module (VRM) shown in FIG. 21, with the resistance selection button in the depressed configuration.
Figure 22B:
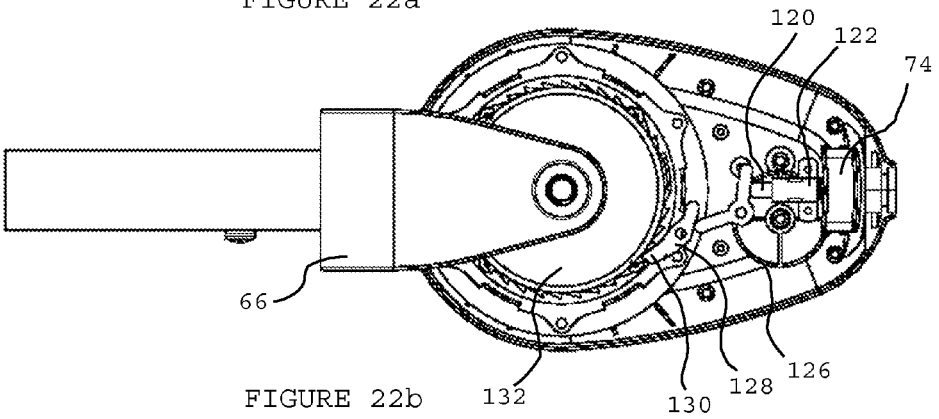

In particular, in FIGS. 21, 22a, and 22b, one resistance selection button 72 is shown in the pressed in configuration. The resistance selection button 72 includes a shaft 120 having a biasing member 122 received thereon, which shaft 120 passes through a shaft receiving cage 124 positioned within the Variable Resistance Module (VRM) 68.

The end of the shaft 120 opposed to the resistance selection button 72 engages a pivot cam 126. The pivot cam 126 engages a rocker bar 128, which includes an engaging tooth 130 at one end thereof.

Figure 24A:
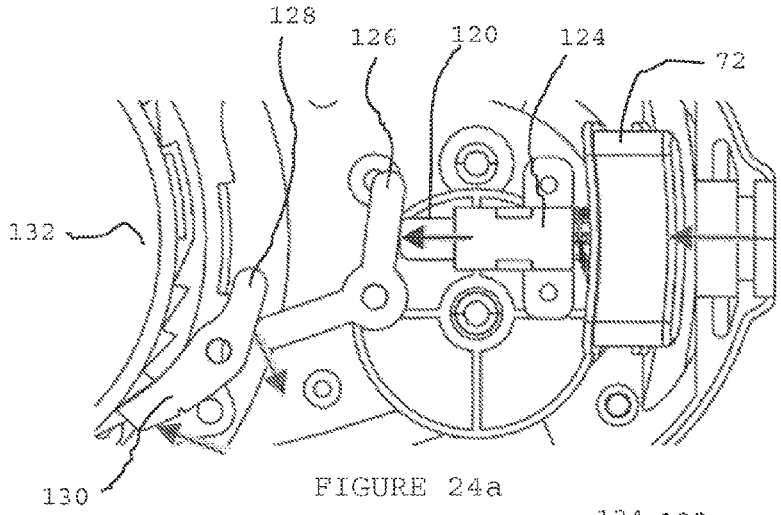
FIGS. 24a and 24b are partial top views of the resistance selection button in the depressed configuration and undepressed configuration, respectively.
Figure 24B:
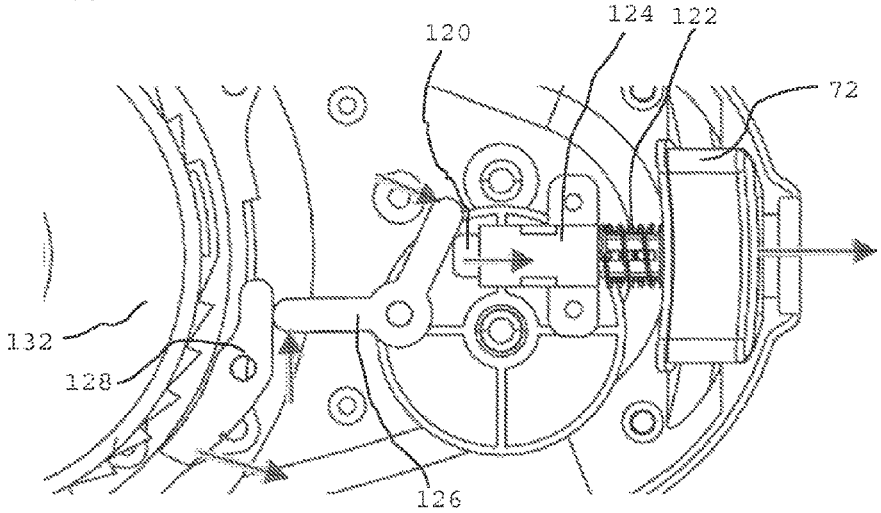

As best exemplary shown in FIGS. 24a and 24b, each of the pivot cam 126 and the rocker bar 128 are biased to provide the necessary contact therebetween (the pivot cam 126 is biased into contact with the end of the shaft 120 and the rocker bar 128 is biased into contact with the pivot cam 126).

When the resistance selection button 72 is pressed in to select a resistance, the pivot cam 126 is pivoted, and the rocker bar 128 rotates, such that the engaging tooth 130 engages one of the ratchet teeth on ratchet plate 132. The ratchet plate 132 is coupled to a torsion spring (not shown), which engages a spring plate 134, which spring plate 134 is coupled to a winding pulley 136, which may also include a torsion spring (not shown) to provide a first resistance and/or to provide the mechanism to wind up the cable/cord 76.

When the resistance selection button 72 is pressed in to select a resistance and the engaging tooth 130 of the rocker bar 128 engages a ratchet tooth on the ratchet plate 132, the ratchet plate 132 no longer freely rotates within the Variable Resistance Module (VRM) 68, such that the torsion spring is thus engaged between the ratchet plate 132 and the spring plate 134 to provide additional resistance against pulling of the cable/cord 76.

Figure 23A:
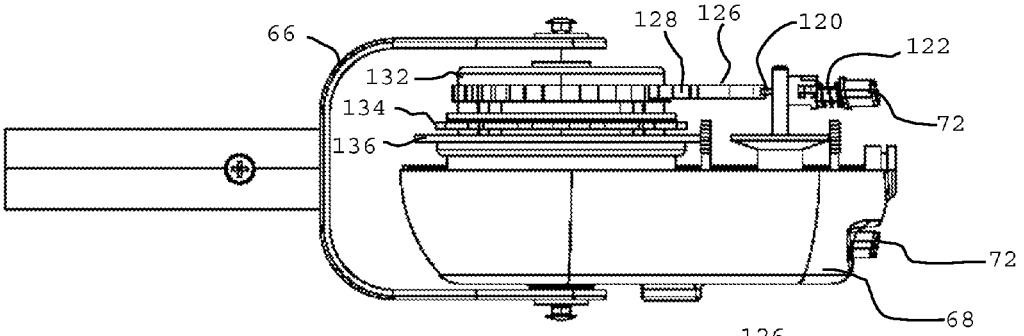
FIGS. 23a and 23b are side and top views, respectively, of the Variable Resistance Module (VRM) shown in FIG. 21, with the resistance selection button in the undepressed configuration.
Figure 23B:
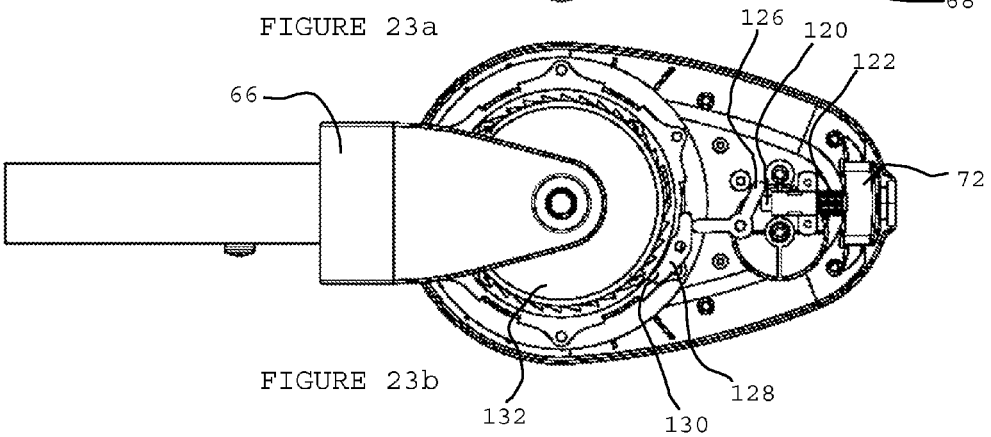

As shown in FIGS. 23a and 23b, when the resistance selection button 72 is not pressed, the engaging tooth 130 of the rocker bar 128 does not engage the teeth of the ratchet plate 132, such that the ratchet plate 132 can freely rotate so that the torsion spring is thus not engaged between the ratchet plate 132 and the spring plate 134, and therefore, the resistance is provided by the torsion spring and the winding pulley 136 only.

Figure 25:
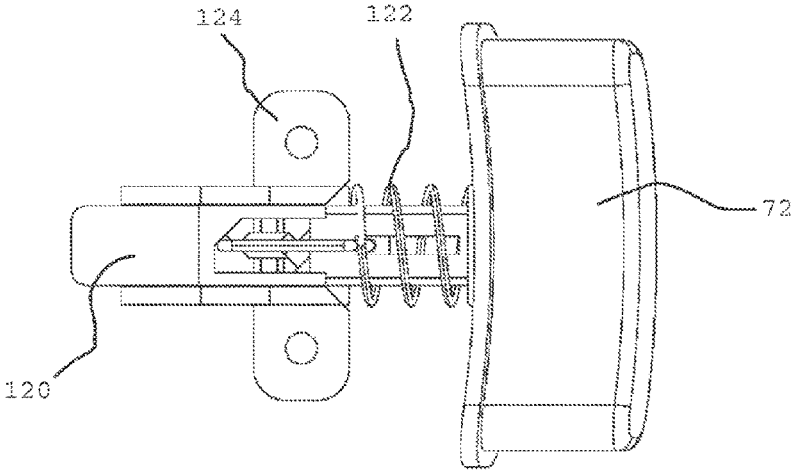
FIG. 25 is a top view of the resistance selection button in isolation.

The resistance selection button 72 is shown in detail in FIG. 25. The resistance selection button 72 is configured such that pressing the button in once locks the button in the depressed configuration, and pressing the button a second time releases the button from the locked, depressed configuration. In this manner, the resistance of the Variable Resistance Module (VRM) 68 can be set and locked in one of three settings depending upon whether one, two, or none of the resistance selection buttons 72 are locked in the depressed configuration.

In order to provide a wider variety of strength training, interchangeable Variable Resistance Modules (VRM) 68 having different resistance increments can be provided for attachment to the extension bar 64.

Figure 26A:
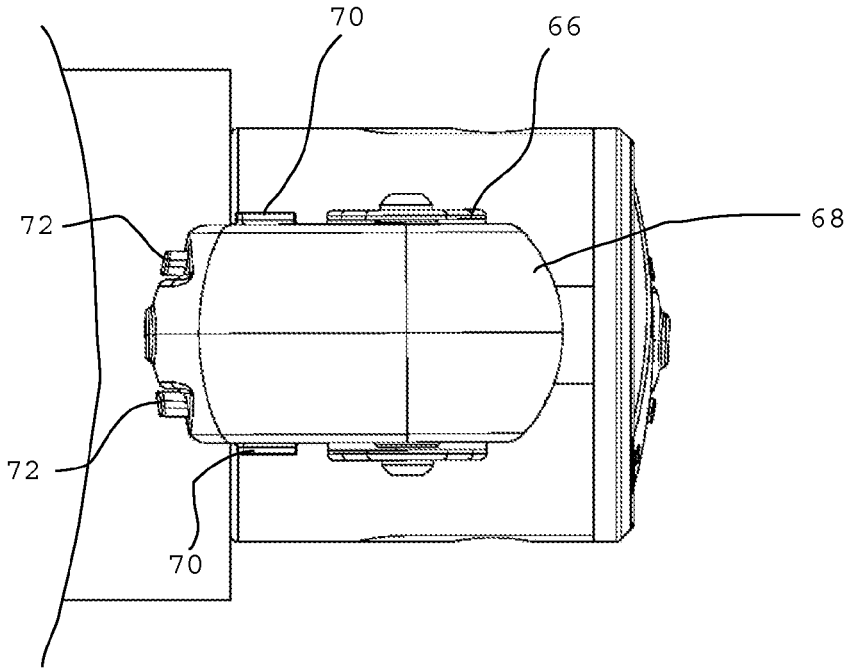
FIGS. 26a and 26b are side views showing the clevis and Variable Resistance Module (VRM) of FIG. 19 with the clevis providing rotation of at least 180 degrees.
Figure 26B:
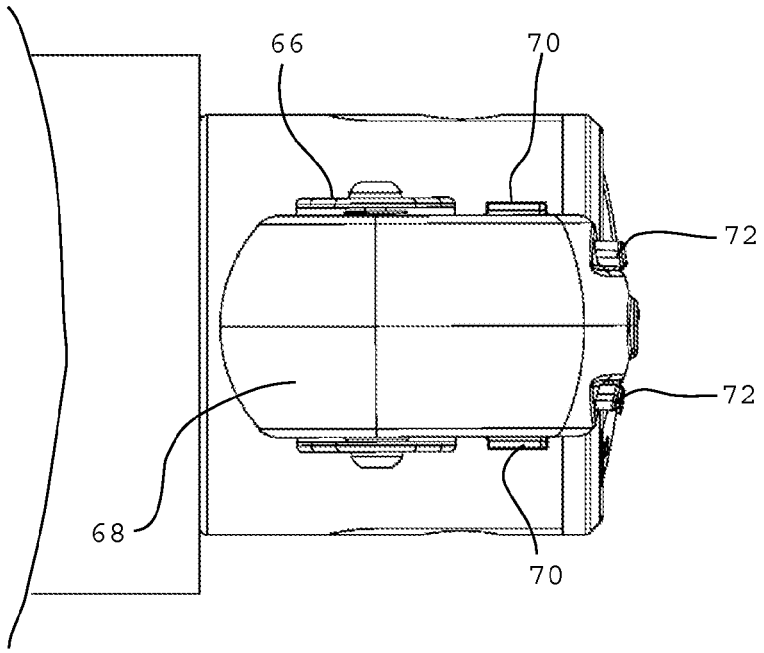

As shown in FIGS. 26a and 26b, the clevis 66 also provides rotation, about an axis perpendicular to the rotation axis of the Variable Resistance Module (VRM) 68. The clevis 66 can allow any amount of desired rotation or can be provided with a rotation limiting mechanism.

Figure 27:
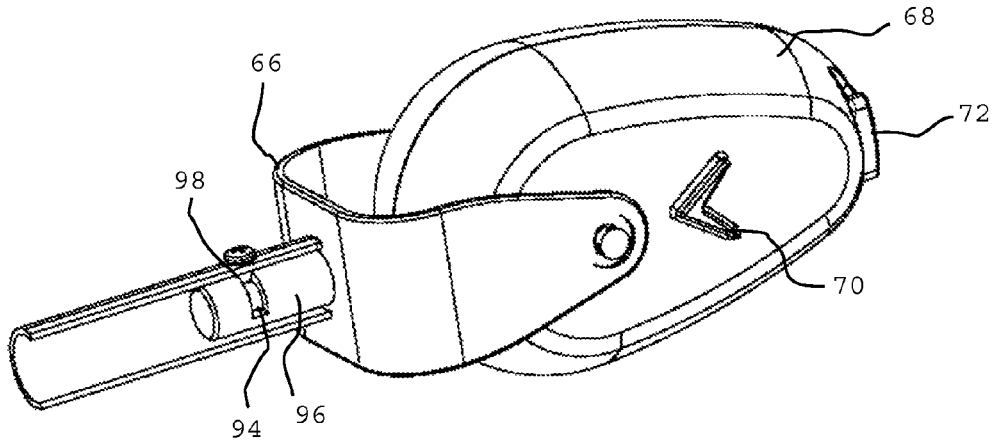
FIG. 27 is a perspective view of the Variable Resistance Module (VRM) and clevis showing the rotation limiting mechanism for the clevis.

For example, as shown in FIG. 27, a clevis 66 rotation limiting mechanism is provided. The exemplary rotation limiting mechanism is in the form of a groove 94 formed in the clevis rotation shaft 96, which is inserted into the end of the extension bar 64. The circumferential size of the groove 94 determines the amount of angular rotation of the clevis 66. A stud 98 (in this case a screw or machine screw) is inserted through the extension bar 64 and sits within the groove 94 in order to limit rotation of the clevis 66 with respect to the extension bar 64. Any suitable and desired range of rotation, for example, 270 degrees, 180 degrees, 90 degrees, 45 degrees, or any other desired range within 360 degrees, can be provided by provided the groove 94 in the desired amount of rotation around the circumference of the clevis rotation shaft 96.

Like previously discussed embodiments, the extension bar 64 is removable from the roller 50, and can be stored within the hollow cavity of the roller 50 for ease with portability of the multi-purpose whole body exercise device.

In order to easily repeat and properly position the extension bar 64 on the roller 50, as shown in FIG. 19, locating notches 60 are provided in the wall of the roller 50 at the open end 56 thereof. While four locating notches 60 are shown, fewer or more can be utilized.

The extension bar 64 includes locating flanges 78 that are complementary shaped and correspondingly positioned with respect to the locating notches 60, so that the locating flanges 78 seat within the locating notches 60 to properly position the extension bar 64.

Additionally, a positioning piece 80 can be provided to further ensure proper positioning and retention of the extension bar 64. The positioning piece 80 also includes locating flanges 82 and can be inserted into the open end 56 of the roller 50 on top of and perpendicularly to the extension bar 64, so that the locating flanges 82 engage with the locating notches 60 that are not engaged by the locating flanges 78 of the extension bar 64.

Further, the removable and lockable end cap 58 is attached to the open end 56 of the roller 50 to lock the extension bar 64 and positioning piece 80 in place.

As seen in FIG. 17, lock stops 62 are positioned around the inner circumferential surface of the open end 56 of the roller 50 for selective engagement with lock stop receiving portions 86 on the removable and lockable end cap 58 (FIGS. 18a, 18b).

The removable and lockable end cap 58 is provided with a handle 84 so that a user can grasp the handle 84 to insert the end cap 58 into the open end 56 of the roller 50 and rotate the end cap 58 from an unlocked orientation to a locked orientation.

The handle 84 includes a biased lock button 88, which, as shown in FIGS. 18a and 18b, includes a ramped portion 90 having a locking edge 92 at one side thereof to selectively engage a lock stop 62 in order to prevent accidental rotation of the end cap 58 to an unlocked orientation.

In use, the end cap 58 is inserted into the open end 56 of the roller 50 with the lock stops 62 aligned for insertion into a respective lock stop receiving portion 86. The end cap 58 can then be rotated without engaging the lock button 88, such that the lock stop 62 comes into contact with the ramped portion 90 of the lock button 88 to cause the lock button 88 to move against the biasing force to allow the lock stop 62 to move past the lock button 88 into the lock stop receiving portion 86.

Once the lock stop 62 has moved past the lock button 88 and into the lock stop receiving portion 86, the lock button 88 is biased back into the unactuated position, such that the locking edge 92 engages and prevents the lock stop 62 from rotating out of the lock stop receiving portion 86. In order to remove the end cap 58, the lock button 88 is actuated against the biasing force so that the locking edge 92 no longer engages the lock stop 62, such that the lock stop 62 can be rotated out of the lock stop receiving portion 86.

In this manner, the removable end cap 58 is selectively lockable to prevent the accidental rotation thereof in order to securely retain the extension bar 64 connected to the open end 56 of the roller 50.

It can be seen that this embodiment of the portable multi-purpose whole body exercise device therefore provides a quick and easy method of configuring the device from a portable configuration, where the extension bar is stored within the device, to an operative configuration, where the extension bar is positioned at the end of the device to provide resistance modules to aid with providing numerous different exercises for a user to perform.

D. Various Accessories

Various accessories for the portable multi-purpose whole body exercise device can also be provided.

Figure 28:
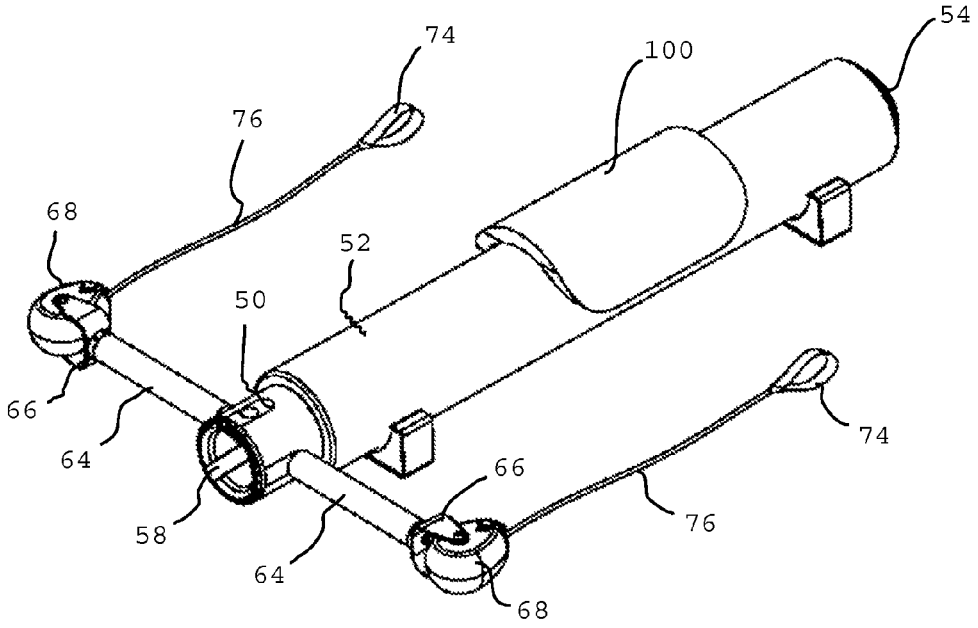
FIG. 28 is a perspective view of the portable multi-purpose whole body exercise device, including a cushioned pad.

For example, as shown in FIG. 28 for users who may have weaker pelvic and hip bones, such as elderly users or persons having osteoporosis, additional protective accessories may be provided. In particular, a cushioned pad 100, which may be of any suitable shape or size, and which may be formed from a suitable viscoelastic foam or gel material, such as, for example, silicone, or may include an inflatable bladder, can be provided to lay flat across the roller under the pelvic region of the user during specific exercises that require the user to lie or sit on the roller. In this way, the cushioned pad 100 provides additional support to the pelvic region of the user.

Figure 29:
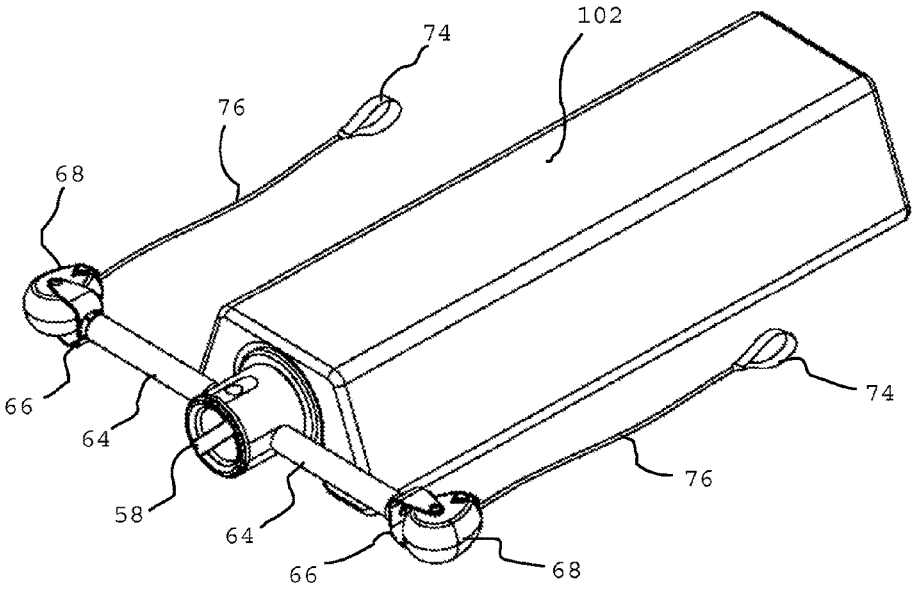
FIG. 29 is a perspective view of the portable multi-purpose whole body exercise device, including a stability box.

An alternative accessory, as shown in FIG. 29, which can also be provided for users who may have weaker pelvic and hip bones, or for larger sized users, is a stability box 102. The stability box 102 is in the form of an elongated box that is placed over the roller so that a user can lie or sit on the stability box 102, instead of the roller 50, in order to perform specific exercises. The stability box 102 can open at the longitudinally opposed ends thereof to accommodate the roller 50 within the stability box 102, so that one or both of the ends of the roller 50 can extend beyond the ends of the stability box 102. In this way, the stability box 102 can provide a more stable, as well as a larger surface area for the user to lie or sit upon while performing specific exercises, yet still allowing for some level of user interface with the roller itself in order to maintain the instability element of certain exercises.

Figure 30:
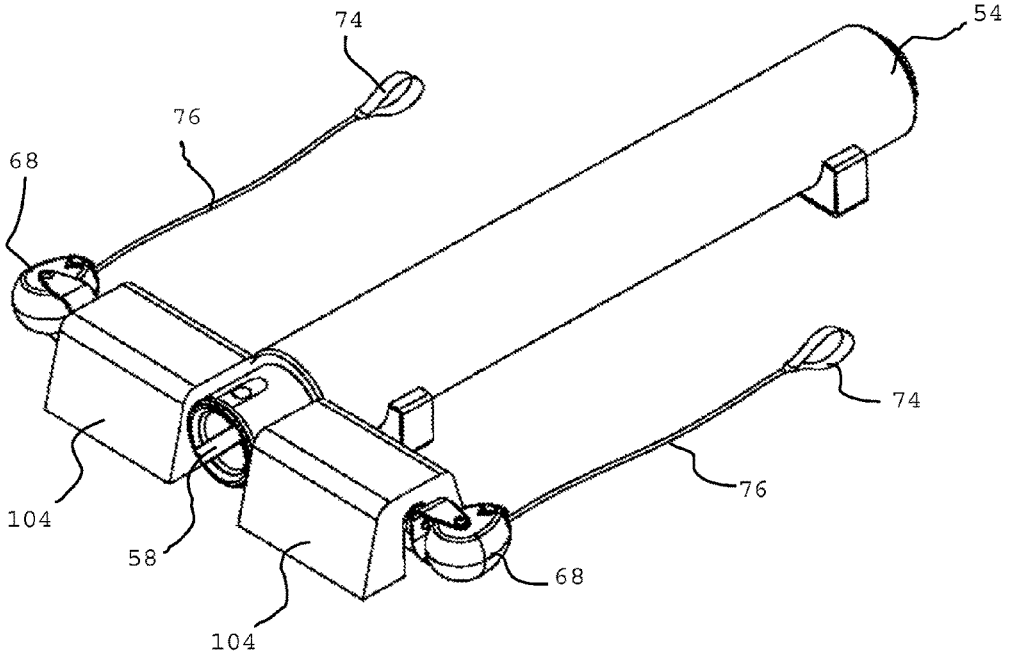
FIG. 30 is a perspective view of the portable multi-purpose whole body exercise device, including stability steps.

A similar accessory to the stability box 102 may be provided, as shown in FIG. 30, to provide the roller with a configuration suitable for use as a step exercise device. In particular, stability steps 104 can be provided to sit over the extension bars 64 (like the stability box 102 covers the roller 50), and to provide support underneath the extension bars 64 to prevent rotation of the roller 50 on the supporting surface. With the stability steps 104 in place over and supporting the extension bars 64, a user can perform step exercises, with or without manipulating the hand loops 74 to utilize the Variable Resistance Modules (VRM) 68.

Figure 31:
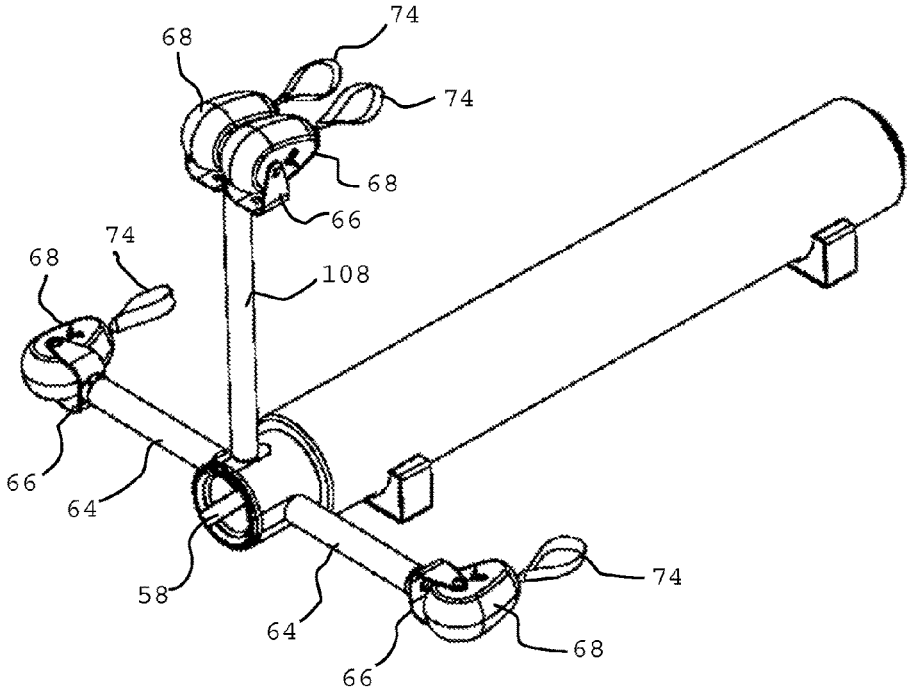
FIG. 31 is a perspective view of the portable multi-purpose whole body exercise device, including a vertical extension bar.
Figure 32:
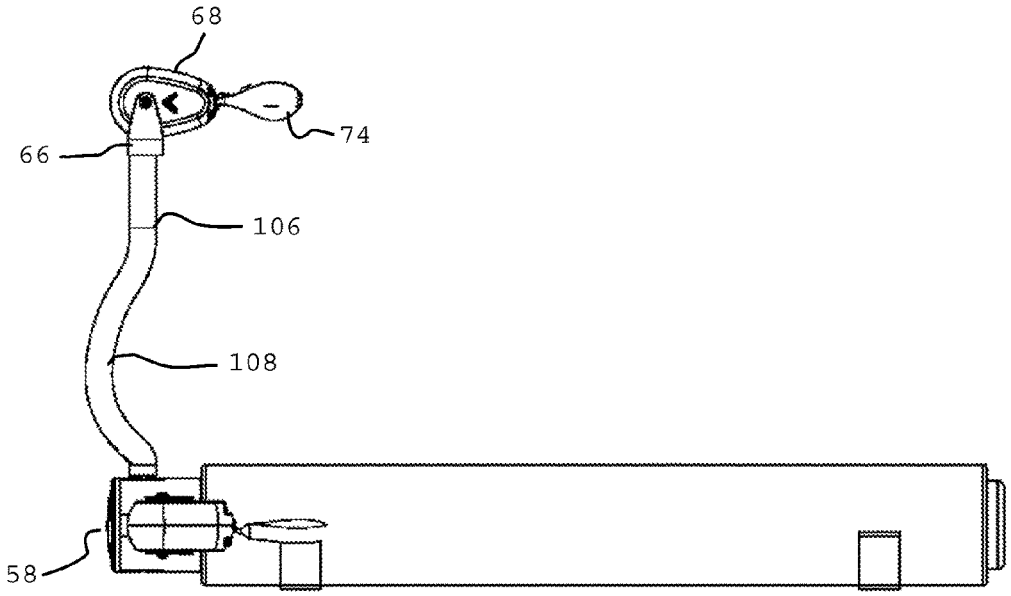
FIG. 32 is a side view of the portable multi-purpose whole body exercise device, including a vertical extension bar having a clearance curvature.

As shown in FIGS. 31 and 32, an additional accessory may be a vertical extension bar 106 (the general details of which are described above with respect to extension bar 64), which can be removably connected to the removable end cap 58, for example, by inserting one end of the vertical extension bar 106 into a hole provided in the removable end cap 58. Any other suitable mechanism for removably connecting the vertical extension bar 106 to the removable end cap 58 may also be used. As shown, the vertical extension bar 106 can include two Variable Resistance Modules (VRM) 68 connected to the opposed end thereof. In the exemplary embodiment shown in FIG. 32, the vertical extension bar 106 is provided with a clearance curvature 108 near the removable end cap 58 in order to provide more clearance between the user and the vertical extension bar 106. Like the extension bar 64, the vertical extension bar 106 can be configured to be retained within the center of the hollow portion of the roller 50 for ease of transportation.

Figure 33A:
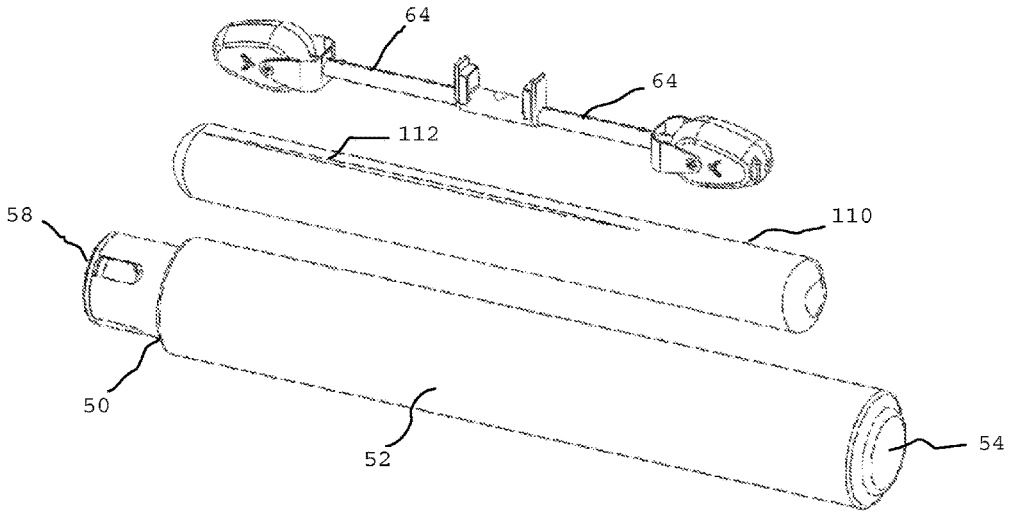
FIG. 33a is a perspective view of the portable multi-purpose whole body exercise device, including the extension bar disassembled, and also including an inner case.
Figure 33B:
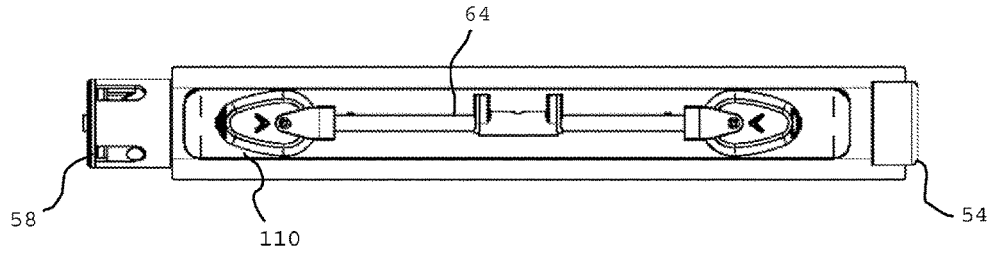
FIG. 33b is a side view of the portable multi-purpose whole body exercise device having the extension bar retained within the inner case, which is retained inside the core of the portable multi-purpose whole body exercise device.

The use of a further accessory is shown in FIGS. 33a and 33b. In particular, an inner case 110 is provided to accommodate and protect the extension bar 64 when the extension bar is stored inside the roller 50. The inner case 110 can be formed in a generally cylindrical configuration and having closed ends, with an opening 112 provided generally longitudinally along one side thereof. The extension bar 64 can be inserted through the opening 112 into the case 110. The inner case 110 can be formed from any suitable material, and may be a semi-rigid or soft case. Exemplary materials include, for example, soft fabrics, neoprene rubber, any other open or closed cell foam or any gel material, or any suitable plastic material, such as, for example, low or high density polyethylene. If the case 110 is made from a fabric material, the opening may be closed by, for example, the use of a zipper closure, snap closures, and/or hook and loop closures. For a semi-rigid plastic case, the inherent resiliency of the material will tend to close the opening.

Once the extension bar 64 is inserted through the opening 112 and into the case 110, the case 110 can be inserted into the open space of the roller 50, as shown in FIG. 33b for storage and to ease portability of the exercise device.

Additional accessories which may be provided include, but are not limited to, an exterior carrying bag (for example, as shown in FIG. 9) provided to enclose the exercise device therein for ease of transporting the exercise device. Such a carrying bag can include one or more straps, for example, shoulder straps, so that the exercise device may be more easily carried in a hands free manner. Such a shoulder strap may be provided, for example, directly removably attached to the ends of the exercise device itself, for example by snap fasteners, or by clips at the ends of the strap, which removably connect to rings secured at the ends of the exercise device.

E. Conclusion

It will be recognized that the portable multi-purpose whole body exercise device and components thereof can be made from any suitable materials.

It will also be recognized that, while specific size ranges for components of the portable multi-purpose whole body exercise device have been disclosed, the portable multi-purpose whole body exercise device and components thereof may have any suitable size as may be appropriate for use by persons having different sizes.

Of course, it is to be understood that not necessarily all objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The skilled trainer or athlete will recognize the interchangeability of various disclosed features from the disclosed embodiments and variations. In addition to variations described herein, other known equivalents for each feature can be mixed and matched by one of ordinary skill in this art to construct a portable multi-purpose whole body exercise device in accordance with principles of the present invention.

Although this invention has been disclosed in the context of exemplary embodiments and examples, it therefore will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited only to the particular disclosed embodiments described above.

What is claimed is:

1. A multipurpose portable whole body exercise device, comprising:

a cylindrical hollow tube having an open end selectively closed by a removable end cap;

an extension bar configured to be selectively arranged between a storage position within the cylindrical hollow tube and an operative position at the open end, wherein in the operative position, the extension bar is attached to and extends [at an angle greater than zero and less than 180 degrees] from the cylindrical hollow tube at the open end *at an angle of about 90 degrees with respect to the cylindrical hollow tube*; and a resistance device [which is removable and can attach] *removably attached* to the extension bar and which, in the [operable] *operative* position, can be engaged by a user [positioned on the cylindrical hollow tube] to perform exercise.

2. The multipurpose portable whole body exercise device according to claim 1, wherein in the operative position, the extension bar is attached to and extends perpendicularly from two opposed sides of the rigid cylindrical hollow tube.

3. The multipurpose portable whole body exercise device according to claim 1, [further comprising] *wherein the resistance device comprises*:

a rotatable clevis and a rotatable variable resistance module positioned on each end of the extension bar.

4. The multipurpose portable whole body exercise device according to claim 3, wherein a groove is provided on a rotation shaft of the clevis, and a stud passes through the extension bar and extends into the groove to provide a rotation limiting mechanism.

5. The multipurpose portable whole body exercise device according to claim 3, wherein a V-shaped rotation stop portion is provided on the variable resistance module for selective engagement with sides of an arm of the clevis in order to prevent rotation of the variable resistance module in a complete circle.

6. The multipurpose portable whole body exercise device according to claim 3, wherein the variable resistance module has three resistance settings, a first, minimum resistance setting, a second, intermediate resistance setting, and a third, maximum resistance setting.

7. The multipurpose portable whole body exercise device according to claim 1, wherein the open end includes at least one locating notch formed therein.

8. The multipurpose portable whole body exercise device according to claim 7, wherein the extension bar includes at least one locating flange that is complementary shaped and configured for insertion within the at least one locating notch.

9. The multipurpose portable whole body exercise device according to claim 7, further comprising: a positioning piece having at least one locating flange that is complementary shaped and configured for insertion within the at least one locating notch.

10. The multipurpose portable whole body exercise device according to claim 1, further comprising: at least one lock stop formed on an inner surface of the open end; and at least one lock stop receiving portion formed on the end cap; wherein the at least one lock stop is configured to be selectively received and retained within the at least one lock stop receiving portion.

11. The multipurpose portable whole body exercise device according to claim 1, wherein the end cap includes a handle and a biased lock button.

12. The multipurpose portable whole body exercise device according to claim 1, further comprising: an interchangeable resilient material covering a portion of an outer surface of the cylindrical hollow tube with the open end of the tube exposed.

13. The multipurpose portable whole body exercise device according to claim 1, further comprising: a vertical extension bar configured to be selectively arranged between a storage position within the cylindrical hollow tube and an operative position at the open end.

14. The multipurpose portable whole body exercise device according to claim 13, wherein the vertical extension bar includes a curvature of the bar to provide clearance for a user.

15. The multipurpose portable whole body exercise device according to claim 1, further comprising: a cushioning pad configured to be placed upon the cylindrical hollow tube to provide cushioning for a user.

16. The multipurpose portable whole body exercise device according to claim 1, further comprising: an inner case for retaining the extension bar therein in the storage position within the cylindrical hollow tube.

17. The multipurpose portable whole body exercise device according to claim 1, further comprising: a stability box configured to cover the cylindrical hollow tube on a supporting surface, wherein at least the open end of the cylindrical hollow tube extends beyond an end of the stability box.

18. The multipurpose portable whole body exercise device according to claim 1, further comprising:

at least one stability step configured to cover at least a portion of the extension bar, wherein a rotatable clevis and a rotatable variable resistance module positioned on an end of the extension bar are not covered by the at least one stability step.

19. The multipurpose portable whole body exercise device according to claim 1, further comprising:

at least one stabilization wedge configured to be placed between the cylindrical hollow tube and a supporting surface to prevent rotation of the cylindrical hollow tube on the supporting surface.

20. A multipurpose exercise apparatus, comprising:

a cylindrical tube having an outer surface and an inner surface;

an interchangeable resilient material covering a portion of the outer surface of the cylindrical tube with the ends of the tube exposed;

juxtaposed channels inside the cylindrical tube attached to the inner surface of said cylindrical tube with retractable extension bars secured to said channels, wherein the retractable extension bars may be withdrawn from the tube to an operating position while at least partially supported by the channels; and at least one variable resistance module [which is removable and can attach] *removably attachable* to at least one of said extension bars and which has at least one loop attached which can be grasped by a hand of a user or which can receive a foot of a user.

* * * * *